US010680739B2

(12) United States Patent
Swinkels et al.

(10) Patent No.: US 10,680,739 B2
(45) Date of Patent: Jun. 9, 2020

(54) SYSTEMS AND METHODS TO INCREASE CAPACITY IN OPTICAL NETWORKS BASED ON EXCESS MARGIN

(71) Applicant: Ciena Corporation, Hanover, MD (US)

(72) Inventors: Gerard L. Swinkels, Ottawa (CA); David W. Boertjes, Nepean (CA); David Miedema, Ottawa (CA); Kim B. Roberts, Nepean (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/208,975

(22) Filed: Dec. 4, 2018

(65) Prior Publication Data

US 2019/0386766 A1  Dec. 19, 2019

Related U.S. Application Data

(63) Continuation of application No. 15/338,878, filed on Oct. 31, 2016, now Pat. No. 10,148,384, which is a continuation of application No. 14/536,871, filed on Nov. 10, 2014, now Pat. No. 9,509,434.

(Continued)

(51) Int. Cl.
*H04J 14/02* (2006.01)
*H04B 10/572* (2013.01)
(Continued)

(52) U.S. Cl.
CPC ...... *H04J 14/0227* (2013.01); *H04B 10/0795* (2013.01); *H04B 10/572* (2013.01);
(Continued)

(58) Field of Classification Search
None
See application file for complete search history.

(56) References Cited

U.S. PATENT DOCUMENTS 6,433,904 B1  8/2002 Swanson et al.
6,459,832 B1  10/2002 Smith et al.
(Continued)

FOREIGN PATENT DOCUMENTS

EP         2403169 B1     1/2013
WO    2011051442 A9     9/2011

OTHER PUBLICATIONS

Jinno, Masahiko et al., "Concept and Enabling Technologies of Spectrum-Sliced Elastic Optical Path Network (SLICE)," NTT Network Innovation Laboratories, NTT Corporation, 2009, pp. 1-2.
(Continued)

*Primary Examiner* — Darren E Wolf
(74) *Attorney, Agent, or Firm* — Clements Bernard Walker; Christopher L. Bernard; Lawrence A. Baratta, Jr.

(57) ABSTRACT

A computer-implemented method is implemented in one of a Network Management System (NMS), an Element Management System (EMS), a Software Defined Networking (SDN) controller, and a server executing an SDN application, to increase capacity of one or more links in an optical network. The computer-implemented method includes determining Net System Margin comprising a metric of overall excess margin in the optical network until a Forward Error Correction (FEC) limit is reached; performing an optimization of a plurality of parameters of the optical network to determine which settings are appropriate in the optical network to provide the increased capacity and to consume at least part of the Net System Margin; and causing a plurality of modems in the optical network to change settings based on the optimization to provide the increased capacity.

20 Claims, 24 Drawing Sheets

Related U.S. Application Data

(60) Provisional application No. 62/000,168, filed on May 19, 2014.

(51) Int. Cl.
*H04L 1/00* (2006.01)
*H04B 10/00* (2013.01)
*H04B 10/25* (2013.01)
*H04B 10/079* (2013.01)
*H04B 10/58* (2013.01)

(52) U.S. Cl.
CPC .......... *H04B 10/58* (2013.01); *H04J 14/0241* (2013.01); *H04J 14/0257* (2013.01); *H04L 1/0023* (2013.01); *H04B 10/00* (2013.01); *H04B 10/12* (2013.01); *H04B 10/14* (2013.01); *H04B 10/142* (2013.01); *H04B 10/152* (2013.01); *H04B 10/225* (2013.01); *H04B 10/25* (2013.01); *H04B 10/2503* (2013.01); *H04J 14/0271* (2013.01)

(56) References Cited

U.S. PATENT DOCUMENTS

| | | | |
|---|---|---|---|
| 6,885,820 | B2 | 4/2005 | Eder et al. |
| 7,826,752 | B1 | 11/2010 | Zanoni et al. |
| 7,894,721 | B2 | 2/2011 | Roberts et al. |
| 7,899,340 | B1 | 3/2011 | Bontu et al. |
| 7,986,878 | B2 | 7/2011 | Saunders et al. |
| 8,009,985 | B1 | 8/2011 | Roberts et al. |
| 8,433,192 | B2 | 4/2013 | Frankel et al. |
| 8,526,828 | B2 | 9/2013 | Nakashima et al. |
| 8,624,762 | B2 | 1/2014 | Rival et al. |
| 8,625,997 | B2 | 1/2014 | Evans et al. |
| 8,625,998 | B2 | 1/2014 | Roberts et al. |
| 8,750,722 | B2 | 6/2014 | Dangui et al. |
| 2004/0156644 | A1 | 8/2004 | Yasue et al. |
| 2010/0158531 | A1 | 6/2010 | Chung et al. |
| 2011/0222854 | A1 | 9/2011 | Roberts et al. |
| 2011/0229149 | A1 | 9/2011 | Grubb et al. |
| 2012/0219293 | A1 | 8/2012 | Boertjes et al. |
| 2012/0328296 | A1 | 12/2012 | Sullivan et al. |
| 2013/0177306 | A1 | 7/2013 | Pfau |
| 2013/0209091 | A1 | 8/2013 | Mateosky et al. |
| 2013/0272710 | A1 | 10/2013 | Wang et al. |
| 2014/0205296 | A1 | 7/2014 | Dahlfort et al. |

OTHER PUBLICATIONS

Takara, H. et al., "Spectrally-efficient elastic optical path networks,"NTT Network Innovation Laboratories, NTT Corporation, Jul. 2010, pp. 1-2.

Gerstel, Ori et al, "Elastic OS20.ptical Networking: A New Dawn for the Optical Layer," IEEE Communications Magazine, Feb. 2012, pp. S12-S20.

Christodoulopoulos, Kontantinos, "Elastic Bandwidth Allocation in Flexible OFDM-Based Optical Networks (Invited Paper)," Computer Engineering and Informatics Department, University of Patras, and Research Academic Computer Technology Institute, 2012, pp. 491-500.

Takagi, T. et al., "Dynamic Routing and Frequency Slot Assignment for Elastic Optical Path Networks that Adopt Distance Adaptive Modulation," NTT Network Innovation Laboratories, NTT Corporation, 2011, pp. 1-3.

Zhang, Guoying et al., "A Survey on OFDM-Based Elastic Core Optical Networking," Nov. 2011, pp. 1-48.

Liu, Lei et al., "OpenSlice: an OpenFlow-based control plane for spectrum sliced elastic optical path networks," 1KDDI R&D Laboratories Inc., Feb. 2013, pp. 1-11.

Zhang, Yi et al., "Traffic Grooming in Spectrum-Elastic Optical Path Networks," Tsinghua National Laboratory for Information Science and Technology Department of Electronic Engineering, Tsinghua University, 2011, pp. 1-3.

Ives, David J. et al., "Adapting Transmitter Power and Modulation Format to Improve Optical Network Performance Utilizing the Gaussian Noise Model of Nonlinear Impairments," Journal of Lightwave Technology, vol. 32, No. 21, Nov. 2014, pp. 3485-3494.

Collings, Brandon, New Devices Enabling Software-Defined Optical Networks, New Paradigms in Optical Communications and Networks, pp. 1-6.

Roberts, Ian, Discrete Rate Capacity Maximization, Sep. 4, 2016, pp. 1-6.

Gringeri et al., Extending Software Defined Network Principles to Include Optical Transport, New Paradigms in Optical Communications and Networks, pp. 1-9.

Roberts et al., Convex Channel Power Optimization in Nonlinear WDM Systems Using Gaussian Noise Model, Journal of Lightwave Technology, vol. 34, No. 13, Jul. 1, 2016, pp. 3212-3222.

Oliveira et al., Towards Software Defined Autonomic Terabit Optical Networks, OFC 2014, OSA 2014, pp. 1-3.

Roberts et al., Channel Power Optimization of WDM Systems Following Gaussian Noise Nonlinearity Model in Presence of Stimulated Raman Scattering, pp. 1-11.

Teipen et al., Flexible Bandwidth and Bit-Rate Programmability in Future Optical Networks, ICTON 2012, Tu.C2.1, 2012 IEEE, pp. 1-4.

Zhao et al., The Prospect of Inter-Data-Center Optical Networks, Optical Technologies for Data Center Networks, IEEE Communications Magazine, Sep. 2013, pp. 32-38.

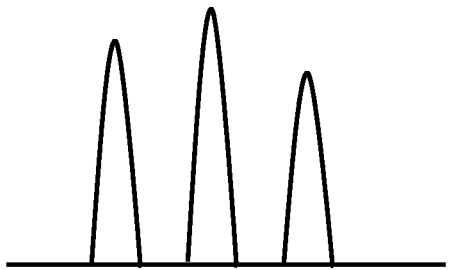
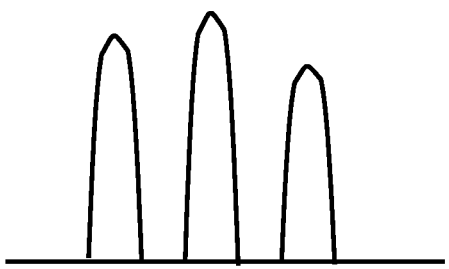
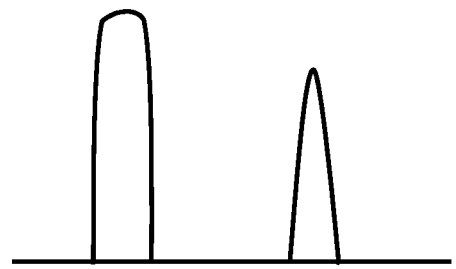
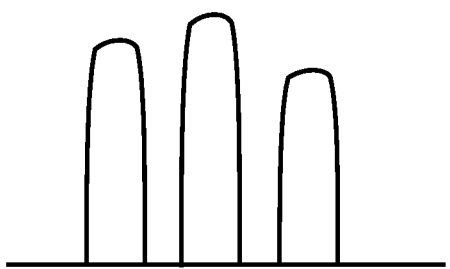
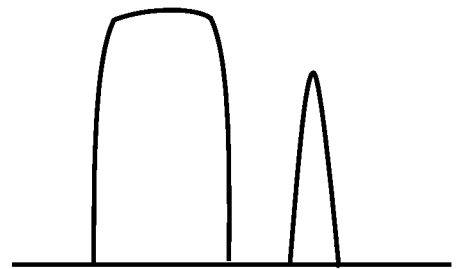
FIG. 8
FIG. 9 ural patent/patent application is a
SYSTEMS AND METHODS TO INCREASE CAPACITY IN OPTICAL NETWORKS BASED ON EXCESS MARGIN

CROSS-SECTION TO RELATED APPLICATION(S)

The present non-provisional patent/patent application is a continuation of U.S. patent application Ser. No. 15/338,878 filed Oct. 31, 2016 and entitled "SYSTEMS AND METHODS TO INCREASE CAPACITY IN OPTICAL NETWORKS BASED ON EXCESS MARGIN," which is a continuation of U.S. patent application Ser. No. 14/536,871 filed Nov. 10, 2014 and entitled "MARGIN-BASED OPTIMIZATION SYSTEMS AND METHODS IN OPTICAL NETWORKS BY INTENTIONALLY REDUCING MARGIN," which claims priority to U.S. Provisional Patent Ser. No. 62/000,168 filed May 19, 2014 and entitled "MARGIN-BASED EQUALIZATION SYSTEMS AND METHODS IN OPTICAL NETWORKS," the contents of each are incorporated by reference herein.

The present non-provisional patent/patent application relates to the following commonly-assigned U.S. patent applications, the contents of which are incorporated by reference herein:

| Filing Date | Ser. No. | Title |
| --- | --- | --- |
| Aug. 26, 2011 | 13/218,759 | CONCATENATED OPTICAL SPECTRUM TRANSMISSION SYSTEMS AND METHODS |
| Feb. 13, 2012 | 13/372,013 | HIGH SPEED OPTICAL COMMUNICATION SYSTEMS AND METHODS WITH FLEXIBILE BANDWIDTH ADAPTATION |
| Feb. 10, 2014 | 14/176,908 | SYSTEMS AND METHODS FOR MANAGING EXCESS OPTICAL CAPACITY AND MARGIN IN OPTICAL NETWORKS |
| Nov. 6, 2014 | 14/534,657 | HITLESS MODULATION SCHEME CHANGE SYSTEMS AND METHODS IN OPTICAL NETWORKS |

FIELD OF THE DISCLOSURE

The present disclosure relates generally to optical network systems and methods. More particularly, the present disclosure relates to margin-based optimization systems and methods in optical networks.

BACKGROUND OF THE DISCLOSURE

Optical network modeling and engineering are concerned with placing viable services (on wavelengths) into a network. Conventionally, link modeling and engineering is performed for forecast tolerant engineering, i.e., all wavelengths, in a Wavelength Division Multiplexed (WDM) are treated equally and any wavelength placed in the network is guaranteed to work (based on the engineering), regardless of conditions, i.e. a worst-case engineering approach. The corollary to this is that initial wavelengths in new deployments will have a large amount of excess margin or wavelengths in a fully-utilized (not all wavelengths present on all links due to contention or blocking) system have excess margin. As optical networks progress, conventional transmitters/receivers (TX/RX), which typically utilized simple on-off keying, are evolving to advanced optical Modulators/Demodulators (modems) with adaptable modulation formats. Other modems (e.g., cell phones, digital subscriber loop modems, cable modems, etc.) perform optimization to provide additional capacity based on current conditions. However, conventionally, optical networks have not performed optimization except for the initial viability determination during link modeling and engineering. Note, while the other modems listed above can perform their optimization with tradeoffs independently on multiple wavelengths (owing to a linear medium), optical networks must perform these optimizations for a full set of wavelengths due to nonlinear interactions in optical fiber and to ensure proper operation at worst case, i.e. full-fill. Stated differently, optical network optimization is vastly different from optimizing in the other modems described above. Additionally, optical networks can differentiate between wavelengths that may or may not need additional capacity (based on the underlying optical modem and service being transported) while the other modems seek to maximize capacity on their linear medium.

It is expected that optical network deployment will move away from up-front engineering for worst-case, end-of-life conditions towards automatic optimization for current conditions, a process that can continually run over the life of the deployment. This will provide additional opportunities for more bandwidth, without increasing capital costs, as optical equipment is run based on a current optimization rather than a forecast tolerant, end-of-life optimization. In this manner, it is important to determine systems and methods for hour-by-hour optimization of optical networks across 15+ years of change (or whatever time period the equipment is engineered and deployed to). This problem statement can be summarized as how to understand mechanisms to optimize all parameters available in highly nonlinear optical networks.

Accordingly, there is a need for margin-based optimization systems and methods based on the characteristics of optical networks and understanding how these can be used to maximize bandwidth based on current conditions.

BRIEF SUMMARY OF THE DISCLOSURE

In an exemplary embodiment, a computer-implemented method is implemented in one of a Network Management System (NMS), an Element Management System (EMS), a Software Defined Networking (SDN) controller, and a server executing an SDN application, to increase capacity of one or more links in an optical network. The method includes determining Net System Margin including a metric of overall excess margin in the optical network until a Forward Error Correction (FEC) limit is reached; performing an optimization of a plurality of parameters of the optical network to determine which settings are appropriate in the optical network to provide the increased capacity and to consume at least part of the Net System Margin; and causing a plurality of modems in the optical network to change settings based on the optimization to provide the increased capacity. The determined Net System Margin can be based on one or more of measured data and estimated data from nodes in the optical network communicated to one of the NMS, the EMS, the SDN controller, and the server, wherein the measured data and the estimated data is utilized to determine real-time margin based on non-linear impairments, link loss, dispersion, and error rates.

The settings can include one or more of per channel power, amplifier gain, wavelength, modulation format, pre-compensation, spectral width, spectral shape, spectral spacing, superchannels, baud rate, and FEC parameters. The computer-implemented method can further include computing and displaying a dashboard showing the Net System Margin and one or more additional metrics of the optical network, wherein the one or more additional metrics include health detailing a view of non-blocked restoration paths and network resiliency and restorability, throughput including how much data is currently being transported in the optical network, and excess bandwidth including how much excess capacity is available in the optical network. The optimization can include one or more of a single channel optimization, a gridded full optimization, a superchannel full optimization, a gridded mesh optimization, a gridless mesh optimization, and a genetic algorithm optimization. The optimization can include a multi-channel, non-linear aware, link modeling routine which uses an objective function. The optimization can have a plurality of assumptions included based on the optical network to constrain inputs. The settings can be adjusted for wavelengths to change optical power, bit rate, baud rate, and modulation format and for optical channels to change parameters associated with paths the wavelengths traverses such as frequency spacing, spectrum amount, and optical component settings.

In another exemplary embodiment, a system includes one of a Network Management System (NMS), an Element Management System (EMS), a Software Defined Networking (SDN) controller, and a server executing an SDN application, adapted to increase capacity of one or more links in an optical network based on overall excess margin in the optical network. The system includes a network interface and a processor communicatively coupled to one another; and memory storing instructions that, when executed, cause the processor to determine Net System Margin including a metric of overall excess margin in the optical network until a Forward Error Correction (FEC) limit is reached, perform an optimization of a plurality of parameters of the optical network to determine which settings are appropriate in the optical network to provide the increased capacity and to consume at least part of the Net System Margin, and communicate via the network interface to the optical network to cause a plurality of modems in the optical network to change settings based on the optimization to provide the increased capacity. The determined Net System Margin can be based on one or more of measured data and estimated data from nodes in the optical network communicated to one of the NMS, the EMS, the SDN controller, and the server, wherein the measured data and the estimated data is utilized to determine real-time margin based on non-linear impairments, link loss, dispersion, and error rates.

The settings can include one or more of per channel power, amplifier gain, wavelength, modulation format, precompensation, spectral width, spectral shape, spectral spacing, superchannels, baud rate, and FEC parameters. The memory storing instructions that, when executed, can further cause the processor to compute and display a dashboard showing the Net System Margin and one or more additional metrics of the optical network, wherein the one or more additional metrics include health detailing a view of non-blocked restoration paths and network resiliency and restorability, throughput including how much data is currently being transported in the optical network, and excess bandwidth including how much excess capacity is available in the optical network. The optimization can include one or more of a single channel optimization, a gridded full optimization, a superchannel full optimization, a gridded mesh optimization, a gridless mesh optimization, and a genetic algorithm optimization. The optimization can include a multi-channel, non-linear aware, link modeling routine which uses an objective function. The optimization can have a plurality of assumptions included based on the optical network to constrain inputs. The settings can be adjusted for wavelengths to change optical power, bit rate, baud rate, and modulation format and for optical channels to change parameters associated with paths the wavelengths traverses such as frequency spacing, spectrum amount, and optical component settings.

In a further exemplary embodiment, an optical network with a system adapted to increase capacity of one or more links based on overall excess margin in the optical network includes a plurality of nodes interconnected optically to one another by a plurality of links; and a server communicatively coupled to one or more of the nodes, wherein the server includes one of a Network Management System (NMS), an Element Management System (EMS), a Software Defined Networking (SDN) controller, and a server executing an SDN application, The server is adapted to determine Net System Margin comprising a metric of overall excess margin in the optical network until a Forward Error Correction (FEC) limit is reached, perform an optimization of a plurality of parameters of the optical network to determine which settings are appropriate in the optical network to provide the increased capacity and to consume at least part of the Net System Margin, and communicate via the network interface to the optical network to cause a plurality of modems in the optical network to change settings based on the optimization to provide the increased capacity.

The determined Net System Margin can be based on one or more of measured data and estimated data from nodes in the optical network communicated to one of the NMS, the EMS, the SDN controller, and the server, wherein the measured data and the estimated data is utilized to determine real-time margin based on non-linear impairments, link loss, dispersion, and error rates. The settings can include one or more of per channel power, amplifier gain, wavelength, modulation format, precompensation, spectral width, spectral shape, spectral spacing, superchannels, baud rate, and FEC parameters. The optimization can include one or more of a single channel optimization, a gridded full optimization, a superchannel full optimization, a gridded mesh optimization, a gridless mesh optimization, and a genetic algorithm optimization.

In a further exemplary embodiment, a method of optimizing capacity of an optical network includes identifying a first wavelength with an associated target capacity; determining that the first wavelength has insufficient capability to operate at the associated target capacity; and adjusting one or more wavelengths to increase capability of the first wavelength such that the first wavelength can operate at the associated target capacity. The adjusting can utilize any one of modifying average power, changing wavelength, changing modulation, and changing precompensation. The determining the insufficient capacity can be comparing one or more link parameters associated with the first wavelength to thresholds and deriving a Net System Margin. one or more link parameters are any of additive noise, Cross-Phase Modulation, Cross-Polarization Modulation, and spectral width. The one or more link parameters can be measured by a modem associated with the first wavelength. The insufficient capability can be based on any of noise margin and spectral width. The insufficient capability can be not enough to either presently meet a performance for the associated target capacity or to meet a performance for the associated target capacity at a future time. The adjusting can utilize changing modulation to achieve any one of reduced nonlinear aggression, reduced spectral width, and changed spectral shape. The method can include performing a nonlinear optimization to determine adjustments to the one or more wavelengths by modeling modem bit rate, Optical Signal to Noise Ratio (OSNR), and whether or not a signal can support additional capacity as real functions in the nonlinear optimization. The adjusting can be simulated in an application prior to operation on nodes in the optical network.

In another exemplary embodiment, a controller for optimizing capacity of an optical network a processor communicatively coupled to a network interface; and memory storing instructions that, when executed, cause the processor to identify a first wavelength with an associated target capacity, determine that the first wavelength has insufficient capability to operate at the associated target capacity, and cause or simulate adjustment of one or more wavelengths to increase capability of the first wavelength such that the first wavelength can operate at the associated target capacity. The adjustment can utilize any of modifying average power, changing wavelength, changing modulation, and changing precompensation. The insufficient capacity can be determined by comparing one or more link parameters associated with the first wavelength to thresholds and deriving a Net System Margin. The one or more link parameters can be any of additive noise, Cross-Phase Modulation, Cross-Polarization Modulation, and spectral width. The one or more link parameters can be measured by a modem associated with the first wavelength. The insufficient capability can be based on any of noise margin and spectral width. The insufficient capability can be not enough to either presently meet a performance for the associated target capacity or to meet a performance for the associated target capacity at a future time. The adjustment can utilize changing modulation to any of reduce nonlinear aggression, reduce spectral width, and change spectral shape. The memory storing instructions that, when executed, further cause the processor to: perform a nonlinear optimization to determine adjustments to the one or more wavelengths by modeling modem bit rate, Optical Signal to Noise Ratio (OSNR), and whether or not a signal can support additional capacity as real functions in the nonlinear optimization.

In a further exemplary embodiment, an optical network a plurality of nodes interconnected by a plurality of links; and a controller communicatively couple to one or more of the plurality of nodes, wherein the controller is configured to identify a first wavelength, between two of the plurality of nodes, with an associated target capacity, determine that the first wavelength has insufficient capability to operate at the associated target capacity, and cause or simulate adjustment of one or more wavelengths, on some or all links associated with the first wavelength, to increase capability of the first wavelength such that the first wavelength can operate at the associated target capacity.

In another exemplary embodiment, a method of optimizing capacity of an optical network, through intentionally reducing margin on one or more wavelengths includes identifying a first wavelength capable of using excess capacity; determining the one or more wavelengths that have extra margin; adjusting at least one of the one or more wavelengths to reduce associated margin to a nominal margin so as to increase supportable capacity of the first wavelength; and increasing capacity of the first wavelength based on the supportable capacity. The adjusting can utilize any one of modifying average power, changing wavelength, changing modulation, and changing precompensation. The reduction to the nominal margin can be based on comparing one or more link parameters associated with one or more wavelengths used to derive a Net System Margin. The one or more link parameters can be any of additive noise, Cross-Phase Modulation, Cross-Polarization Modulation, and spectral width. The one or more link parameters can be measured by a modem associated with the one or more wavelengths. The adjusting can utilize changing modulation to achieve any one of reduced nonlinear aggression, reduced spectral width, and changed spectral shape. The method can further include performing a nonlinear optimization to determine adjustments to the one or more wavelengths by modeling modem bit rate, Optical Signal to Noise Ratio (OSNR), and whether or not a signal can support additional capacity as real functions in the nonlinear optimization. The adjusting can be simulated in an application prior to operation on nodes in the optical network.

In another exemplary embodiment, a controller for optimizing capacity of an optical network, through intentionally reducing margin on one or more wavelengths, the controller includes a processor communicatively coupled to a network interface; and memory storing instructions that, when executed, cause the processor to identify a first wavelength capable of using excess capacity, determine the one or more wavelengths have extra margin, adjust the one or more wavelengths to reduce associated margin to a nominal margin amount so as to increase supportable capacity of the first wavelength, and increase capacity of the first wavelength based on the supportable capacity. The one or more wavelengths can be adjusted through any of modifying average power, changing wavelength, changing modulation, and changing precompensation. The reduction to the nominal margin can be based on comparing one or more link parameters associated with one or more wavelengths used to derive a Net System Margin. The one or more link parameters can be any of additive noise, Cross-Phase Modulation, Cross-Polarization Modulation, and spectral width. The one or more link parameters can be measured by a modem associated with the one or more wavelengths. The one or more wavelengths can be adjusted by changing modulation to any of reduce nonlinear aggression, reduce spectral width, and change spectral shape. The memory storing instructions that, when executed, can further cause the processor to: perform a nonlinear optimization to determine adjustments to the one or more wavelengths by modeling modem bit rate, Optical Signal to Noise Ratio (OSNR), and whether or not a signal can support additional capacity as real functions in the nonlinear optimization. The adjusting can be simulated in an application prior to operation on nodes in the optical network. The controller can be a Software Defined Networking (SDN) controller.

In another further exemplary embodiment, an optical network includes a plurality of nodes interconnected by a plurality of links; and a controller communicatively couple to one or more of the plurality of nodes, wherein the controller is configured to identify a first wavelength capable of using excess capacity, determine the one or more wavelengths have extra margin, adjust the one or more wavelengths to reduce associated margin to a nominal margin amount so as to increase supportable capacity of the first wavelength, and increase capacity of the first wavelength based on the supportable capacity. The controller is further configured to: perform a nonlinear optimization to determine adjustments to the one or more wavelengths by modeling modem bit rate, Optical Signal to Noise Ratio (OSNR), and whether or not a signal can support additional capacity as real functions in the nonlinear optimization. The controller can be a Software Defined Networking (SDN) controller.

In yet another exemplary embodiment, a method of increasing the supportable capacity from a first point to a second point in an optical network includes identifying a first optical signal that occupies a first portion of optical spectrum from the first point to the second point; identifying a second optical signal that occupies a second portion of the optical spectrum from the first point to the second point, wherein the second portion is adjacent to the first portion; adjusting the second optical signal to minimize part of or remove all of the second portion that is adjacent to the first optical signal to provide a freed up portion of the second portion; and adjusting the first optical signal to occupy some or all of the freed up portion. The second optical signal can co-propagate with the first optical signal through a first node of the optical network and separately propagates through a second node of the optical network. The adjusting the first optical signal can be one of converting the first optical signal to a superchannel and increasing a modulation symbol rate. The adjusting the second optical signal can be one of moving the second optical signal to a disjoint portion of the spectrum from the first portion and reducing a spectral width of the second optical signal. The adjusting the second optical signal can include identifying a new path, increasing supported capacity on the new path, and transferring the freed up portion to the new path. The increasing supported capacity on the new path can be any one of reducing nonlinear effects, increasing spectral width, and increasing power. The increasing supported capacity on the new path can be achieving any one of reducing nonlinear effects, increasing spectral width, and increasing power. The new path can be partially disjoint with a route previously taken by the second optical signal. The method can further include performing a nonlinear optimization to determine adjustments to the first optical signal and the second optical signal by modeling modem bit rate, Optical Signal to Noise Ratio (OSNR), and whether or not a signal can support additional capacity as real functions in the nonlinear optimization. The adjusting can be simulated in an application prior to operation on nodes in the optical network.

In yet another exemplary embodiment, a controller for optimizing capacity of an optical network, through intentionally reducing margin on one or more wavelengths, the controller includes a processor communicatively coupled to a network interface; and memory storing instructions that, when executed, cause the processor to identify a first optical signal that occupies a first portion of optical spectrum from the first point to the second point, identify a second optical signal that occupies a second portion of the optical spectrum from the first point to the second point, wherein the second portion is adjacent to the first portion, adjust the second optical signal to minimize part of or remove all of the second portion that is adjacent to the first optical signal to provide a freed up portion of the second portion, and adjust the first wavelength to occupy some or all of the freed up portion. The second optical signal can co-propagate with the first optical signal through a first node of the optical network and separately propagates through a second node of the optical network. The first optical signal can be adjusted by one of converting the first optical signal to a superchannel and increasing a modulation symbol rate. The second optical signal can be adjusted by one of moving the second optical signal to a disjoint portion of the spectrum from the first portion and reducing a spectral width of the second optical signal. The second optical signal can be adjusted by identifying a new path, increasing supported capacity on the new path, and transferring the freed up portion to the new path. The increasing supported capacity on the new path can be any of reducing nonlinear effects, increasing spectral width, and increasing power. The increasing supported capacity on the new path can be any of reducing nonlinear effects, increasing spectral width, and increasing power. The new path can be partially disjoint with a route previously taken by the second optical signal. The memory storing instructions that, when executed, can further cause the processor to: perform a nonlinear optimization to determine adjustments to the second optical signal and/or the first optical signal by modeling modem bit rate, Optical Signal to Noise Ratio (OSNR), and whether or not a signal can support additional capacity as real functions in the nonlinear optimization.

In yet another further exemplary embodiment, an optical network includes a plurality of nodes interconnected by a plurality of links; and a controller communicatively couple to one or more of the plurality of nodes, wherein the controller is configured to identify a first optical signal that occupies a first portion of optical spectrum from a first node to a second node over some of the plurality of links, identify a second optical signal that occupies a second portion of the optical spectrum from the first point to the second point, wherein the second portion is adjacent to the first portion, adjust the second wavelength to minimize part of or remove all of the second portion that is adjacent to the first optical signal to provide a freed up portion of the second portion, and adjust the first optical signal to occupy some or all of the freed up portion.

BRIEF DESCRIPTION OF THE DRAWINGS

The present disclosure is illustrated and described herein with reference to the various drawings, in which like reference numbers are used to denote like system components/method steps, as appropriate, and in which:

FIGS. 6-10 are spectral plots logically illustrating various optimization metrics;

DETAILED DESCRIPTION OF THE DISCLOSURE

In various exemplary embodiments, margin-based optimization systems and methods in optical networks are described. The systems and methods can not only attempt to increase capacity, but also freezes capacity and even reduces optical footprint with a reduction of impact function. That is, the systems and methods propose to optimize as well as penalize (de-optimize) wavelengths for the overall benefit in the optical network, i.e., consume as much margin as possible for additional capacity where it can be harvested. The systems and methods improve specific wavelengths and penalize other wavelengths to improve overall mesh network capacity, treat modems that look the same differently based on an ability to provide additional revenue generating services by providing network capacity, apply a different optical network optimization criteria based on modem traffic carrying potential, and use optical modem traffic carrying potential as a mechanism to determine whether to improve or penalize a specific wavelength service. Note, as described herein, a wavelength, a signal, or an optical signal can be used interchangeably to denote light having been modulated to carry information over a medium within a channel or optical channel. The various optimizations described herein contemplate adjustments to the wavelength (signal) as well as to the channel (optical channel). For example, adjustments to the wavelength include changes to the parameters of the signal such as optical power, bit rate, baud rate, modulation format, etc. Adjustments to the channel include changes to the parameters associated with the path the signal traverses such as frequency spacing, amount of spectrum, amplifier/WSS/VOA settings, etc. That is, anything associated with the signal or the channel can be modified with the objective to carry as much data as possible given current constraints.

Key takeaways for the margin-based optimization systems and methods include: 1) networks can be more efficient than they are conventionally operated; flexible Layer 0 (photonics and modems) can be programmed to increase network capacity; advanced control, modeling and management can take advantage of the increased network capacity; and hybrid packet-optical systems can exploit the increased network capacity for additional opportunities, e.g. both guaranteed and best effort bandwidth. The margin-based optimization systems and methods can introduce equalization/optimization into existing photonic control systems and methods.

In an exemplary embodiment, a method determining for a plurality of wavelength services in a network which support additional network capacity; computing or retrieving Required Optical Signal to Noise Ratio (ROSNR) for each of the plurality of wavelength services; and performing an equalization on the plurality of wavelength services to maximize capacity for those which support the additional network capacity.

Exemplary Optical Network

Figure 1:
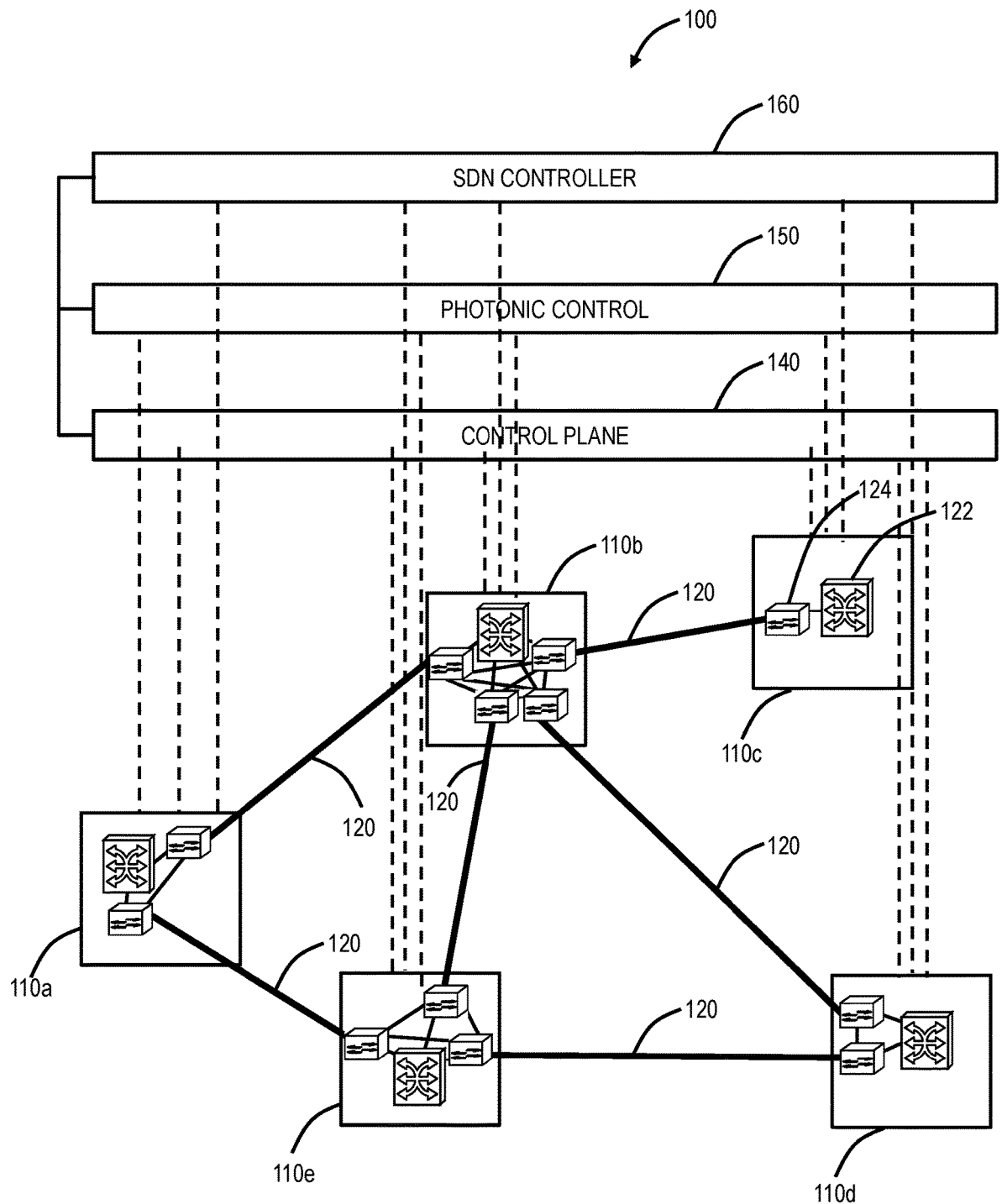
FIG. 1 is a network diagram of an exemplary network with five interconnected sites in a meshed optical network.

Referring to FIG. 1, in an exemplary embodiment, a network diagram illustrates an exemplary network 100 with five interconnected sites 110a, 110b, 110c, 110d, 110e. The sites 110 are interconnected through a plurality of links 120. Each of the sites 110 can include a switch 122 and one or more WDM network elements 124. The switch 122 is configured to provide services at Layers 1 (e.g., OTN/SONET/SDH) and/or Layer 2 (e.g., Ethernet). The WDM network elements 124 provide the photonic layer (e.g., Layer 0) and various functionality associated therewith (e.g., multiplexing, amplification, optical routing, wavelength conversion/regeneration, local add/drop, etc.) including photonic control. Of note, while shown separately, those of ordinary skill in the switch 122 and the WDM network elements 124 may be realized in a same network element. The photonic layer and the photonic control operating thereon can also include intermediate amplifiers and/or regenerators on the links 120 which are omitted for illustration purposes. The network 100 is illustrated, for example, as an interconnected mesh network, and those of ordinary skill in the art will recognize the network 100 can include other architectures, with additional sites 110 or with less nodes sites, with additional network elements and hardware, etc. The network 100 is presented herein as an exemplary embodiment for the margin-based optimization systems and methods.

The sites 110 communicate with one another optically over the links 120. The sites 110 can be network elements which include a plurality of ingress and egress ports forming the links 120. Further, the nodes 110 can include various degrees, i.e. the site 110c is a one degree node, the sites 110a, 110d are two degree nodes, the site 110e is a three degree node, and the site 110b is a four degree node. The number of degrees is indicative of the number of adjacent nodes at each particular node. The network 100 includes a control plane 140 operating on and/or between the switches 122 at the sites 110a, 110b, 110c, 110d, 110e. The control plane 140 includes software, processes, algorithms, etc. that control configurable features of the network 100, such as automating discovery of the switches 122, capacity of the links 120, port availability on the switches 122, connectivity between ports; dissemination of topology and bandwidth information between the switches 122; calculation and creation of paths for connections; network level protection and restoration; and the like. In an exemplary embodiment, the control plane 140 can utilize Automatically Switched Optical Network (ASON), Generalized Multiprotocol Label Switching (GMPLS), Optical Signal and Routing Protocol (OSRP) (from Ciena Corporation), or the like. Those of ordinary skill in the art will recognize the network 100 and the control plane 140 can utilize any type control plane for controlling the switches 122 and establishing connections therebetween.

Service routing in the control plane 140 is well known. A path (e.g., a subnetwork connection (SNC) or label switched path (LSP)) is considered valid for connection setup based on the availability of the switch 122, the links 120, and sufficient bandwidth available thereon. Photonic networks, i.e. Layer 0 and the wavelength interconnectivity of the WDM network elements 124, introduce additional complexity of successfully setting up a service up. This can require that all Layer 0 services are pre-planned and/or managed manually. For example, potential paths for services at the photonic layer can be pre-planned by modeling them offline using a static snapshot of the network state to ensure that the computed paths are optically viable in terms of reach, nonlinear effects, dispersion, wavelength contention/blocking, etc. Here, the forecast tolerant engineering ensures that each wavelength placed into service will work in a worst case Optical Signal to Noise Ratio (OSNR) leading to potential excess margin.

The network 100 can include photonic control 150 which can be viewed as a control plane and/or control algorithm/loop for managing wavelengths from a physical perspective at Layer 0. In one aspect, the photonic control 150 is configured to add/remove wavelengths from the links in a controlled manner to minimize impacts to existing, in-service wavelengths. For example, the photonic control 150 can adjust modem launch powers, optical amplifier gain, variable optical attenuator (VOA) settings, wavelength selective switch (WSS) parameters, etc. In the systems and method described herein, the photonic control 150 is adapted to also perform network optimization on the links 120. This optimization can also include re-optimization where appropriate. In the systems and methods, the photonic control 150 can adjust the modulation format, baud rate, frequency, wavelength, spectral width, etc. of the modems in addition to the aforementioned components at the photonic layer.

The network 100 can also include a Software Defined Networking (SDN) controller 160. SDN allows management of network services through abstraction of lower level functionality. This is done by decoupling the system that makes decisions about where traffic is sent (SDN control through the SDN controller 160) from the underlying systems that forward traffic to the selected destination (i.e., the physical equipment in the network 100). Work on SDN calls for the ability to centrally program provisioning of forwarding on the network 100 in order for more flexible and precise control over network resources to support new services. The SDN controller 160 is a processing device that has a global view of the network 100. Additionally, the SDN controller 160 can include or connect to SDN applications which can utilize the data from the SDN controller 160 for various purposes. In an exemplary embodiment, the SDN applications include a margin optimization application which is described in detail herein.

Figure 2:
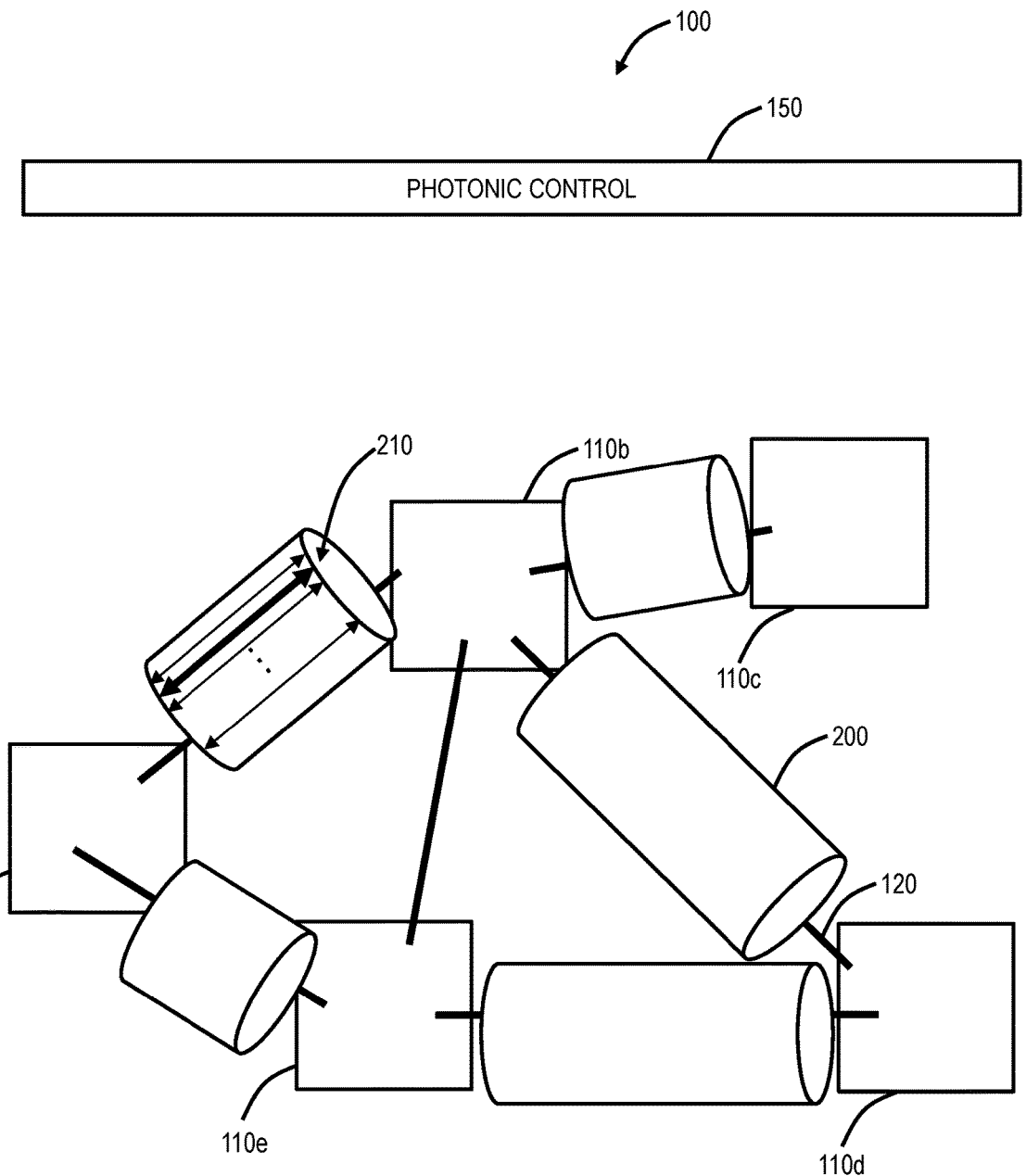
FIG. 2 is a logical network diagram of the network of FIG. 1 with the links logically shown carrying various wavelengths.

Referring to FIG. 2, in an exemplary embodiment, a logical network diagram illustrates the network 100 of FIG. 1 with the links 120 logically shown carrying various wavelengths. The links 120 are shown with an optical fiber 200 which can include any type of optical fiber. For example, the optical fiber 200 can include a useable optical spectrum of 1530 nm to 1565 nm (C-Band). Of course, other spectrums are contemplated. The optical fiber 200 can be a flexible grid, a fixed grid, or a combination across the optical spectrum. Thus, each of the links 120 and their associated optical fiber 200 can support a fixed or variable number of wavelengths 210 (wavelengths can also be referred to as optical signals). The wavelengths 210 traverse a channel which carries an underlying service between two of the sites 110 in the network. Each of the wavelengths 210 is formed by optical modems at two sites 110 where the channel is added/dropped (or regenerated). Since the network 100 is an interconnected mesh, the wavelengths 210 may be different on each of the links 120. Parameters associated with each of the wavelengths 210 can include—A-Z path in the network, spectrum allocation (e.g., fixed spectrum, flexible spectrum, amount of spectrum, location on the spectrum, etc.), modulation format, baud rate, FEC parameters, optical power, etc.

Figure 3:
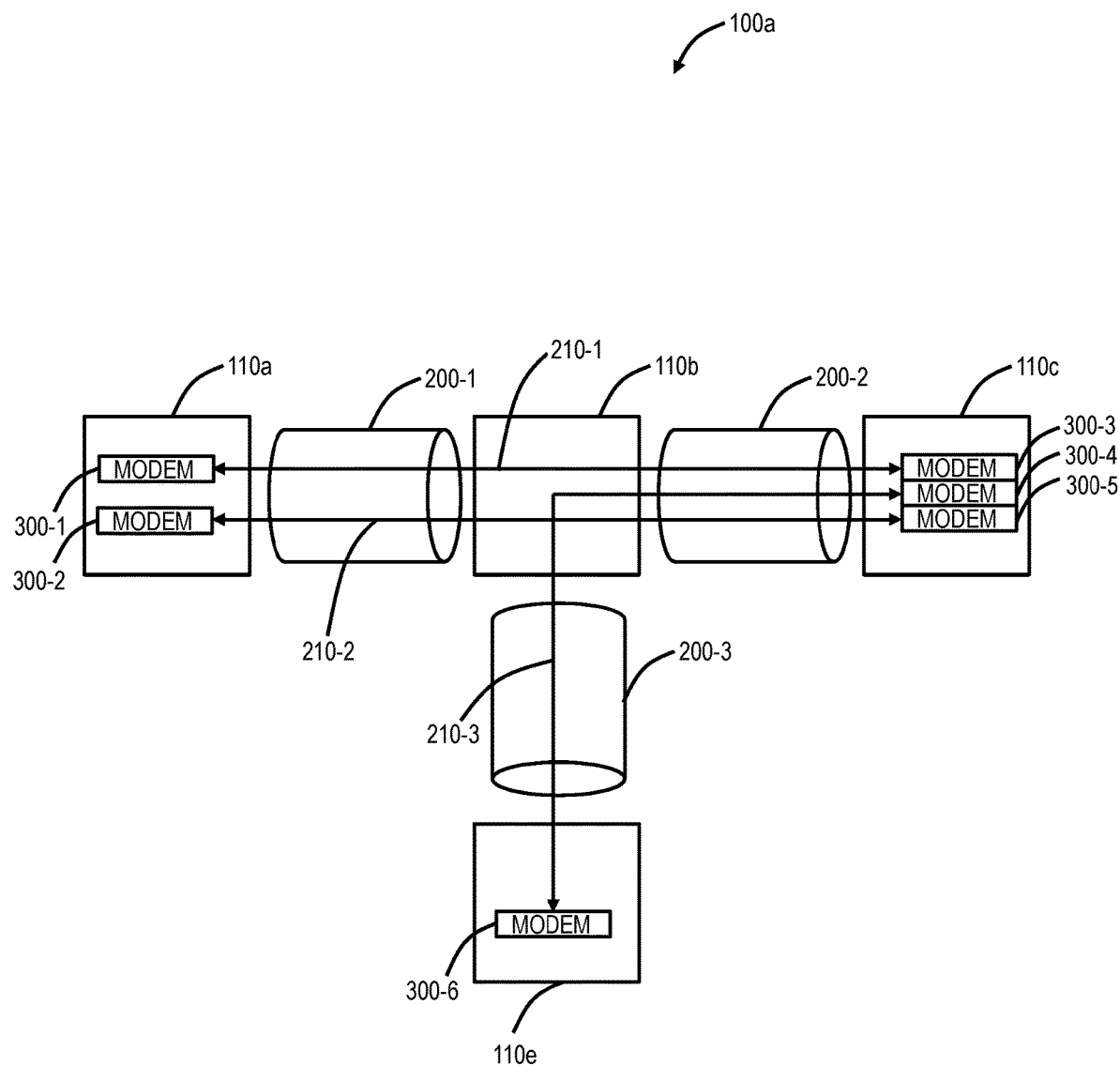
FIG. 3 is a logical network diagram of a subset of the network of FIG. 2 showing a subset of the sites and three exemplary wavelengths.

Referring to FIG. 3, in an exemplary embodiment, a logical network diagram illustrates a subset 100a of the network 100 showing the sites 110a, 110b, 110c, 110e and three exemplary wavelengths 210-1, 210-2, 210-3. In the subset 100a, there is a fiber 200-1 connecting the sites 110a, 110b, a fiber 200-2 connecting the sites 110b, 110c, and a fiber 200-3 connecting the sites 110b, 110e. The wavelengths 210-1, 210-2 are between the sites 110a, 110c and through the fibers 200-1, 200-2 with an express through at the site 110b, and the wavelength 210-3 is between the sites 110e, 110c through the fibers 200-3, 200-2 with an express through at the site 110b. The site 110a includes modems 300-1, 300-2, the site 110c includes modems 300-3, 300-4, 300-5, and the site 110e includes a modem 300-6. Thus, the wavelength 210-1 is formed by the modems 300-1, 300-3, the wavelength 210-2 is formed by the modems 300-2, 300-5, and the wavelength 210-3 is formed by the modems 300-6, 300-4. The various wavelengths 210-1, 210-2, 210-3 can carry any type of traffic such as, without limitation, Optical Transport Network (OTN), SONET, SDH, Ethernet, Frame Relay, IP, MPLS, and the like as well of combinations thereof.

Generally, Wavelength Selective Switches (WSSs) and the like are essentially a polychrometer device with multiple output/input ports. Individual wavelengths (i.e., signals) can be switched by such a device and relatively sharp roll-offs can be achieved. That is, the WSS may be utilized to provide a demultiplexer function. The WSS can provide significantly improved roll-off portions from other technologies such as arrayed waveguide gratings (AWGs) or thin film filters (TFFs), however a significant dead band is still needed for the WSS to separate two signals. In contrast, coherent modems can separate signals in the electrical domain which eliminates almost all of the dead band. Advantageously, through such a configuration, deadbands or guardbands may be reduced or eliminated.

Superchannels

In an exemplary embodiment, using concatenated optical spectrum transmission systems and methods and a flexible grid, wavelengths may be configured to group A-Z demands together and place signals in the spectrum going on the same path without deadbands between the channels in the same path. In this manner, such a grouping can be referred to as a "superchannel." The superchannel grouping is an exemplary technique that may be used by the margin-based optimization systems and methods to achieve more bandwidth (higher spectral efficiency) at the expense of routing constraints.

Generally, one optical modem is associated with the optical signal which is the result of modulating an electrical signal onto one optical carrier. That electrical signal may have a single carrier such as with a single Time Division Multiplexing (TDM) stream of QPSK symbols, a plurality of carriers such as with Nyquist Frequency-Division Multiplexing (FDM), or a very large number of carriers such as with Orthogonal Frequency-Division Multiplexing (OFDM).

In the more straightforward applications, one optical modem communicates a bidirectional digital service from a first geographic location to a second geographic location. A superchannel can be formed by grouping into a contiguous region of optical spectrum the signals from a plurality of modems that are all following the same path.

The "radio ROADM" technique can be used to coherently multiplex and then demultiplex a superchannel at a plurality of geographic locations, while the superchannel is switched as a single entity by the intermediate WSS.

In an exemplary embodiment, each modem 300 is tunable so that it can selectively generate a wavelength centered at a desired carrier wavelength (or frequency). In exemplary embodiments in which tunable modem 300 are used, the wavelength range of each modem 300 may be wide enough to enable the modem 300 to generate any wavelength in the optical spectrum. In other exemplary embodiments, the wavelength range of each modem 300 may be wide enough to enable the modem 300 to generate anyone of a subset of wavelengths in the optical spectrum. The modem 300 may be configured to use any of duo-binary, quadrature amplitude modulation (QAM), differential phase shift keying (DPSK), differential quadrature phase shift keying (DQPSK), orthogonal frequency-division multiplexing (OFDM), polarization multiplexing with any of the foregoing, and any other type of coherent optical modulation and detection technique. It is understood that for electronic channel discrimination, a tunable Rx is required. In nQAM and nPSK it is achieved using a linear receiver, i.e. a receiver where frequency mixing is taking place between a local oscillator and the incoming signal. The Local Oscillator (LO) needs to be tuned at the right frequency such that the mixing product can be at base band where all the necessary filtering will occur. If a receiver is not operating like above, it requires a tunable optical filter prior to the optical detector. Modems The margin-based optimization systems and methods recognize the ability of each of the wavelengths 210 to be optimized is based on 1) the underlying modem's 300 abilities to adjust and 2) the service's need being carried by the wavelength 210. The modems 300 can be classified as either supporting additional capacity or requiring a fixed capacity based on the functionality of the modem 300. For example, the modems 300 can support various different baud rates through software-programmable modulation formats. The modems 300 can support programmable modulation, or constellations with both varying phase and/or amplitude. In an exemplary embodiment, the flexible optical modem can support multiple coherent modulation formats such as, for example, i) dual-channel, dual-polarization (DP) binary phase-shift keying (BPSK) for 100 G at submarine distances, ii) DP quadrature phase-shift keying (QPSK) for 100 G at ultra long haul distances, iii) 16-quadrature amplitude modulation (QAM) for 200 G at metro to regional (600 km) distances), or iv) dual-channel 16QAM for 400 G at metro to regional distances. Thus, in an exemplary embodiment, the same modem 300 can support 100 G to 400 G. With associated digital signal processing (DSP) in the modem 300 hardware, moving from one modulation format to another is completely software-programmable.

In another exemplary embodiment, the modem 300 can support N-QAM modulation formats with and without dual-channel and dual-polarization where N can even be a real number and not necessarily an integer. Here, the modem 300 can support non-standard speeds since N can be a real number as opposed to an integer, i.e. not just 100 G, 200 G, or 400 G, but variable speeds, such as 130 G, 270 G, 560 G, etc. These rates could be integer multiples of 10 Gb/s, or of 1 Gb/s. Furthermore, with the DSP and software programming, the capacity of the flexible optical modem can be adjusted upwards or downwards in a hitless manner so as to not affect the guaranteed rate. In other exemplary embodiments, the modem 300 can include hardware which lacks the aforementioned functionality and thus supports a single modulation format/baud rate which cannot be adjusted (but other parameters can be adjusted like power, spectrum location, etc.). Additionally the modems 300 can tune and arbitrarily select spectrum; thus no optical filters are required. Additionally, the modem 300 can support various aspects of nonlinear effect mitigation and dispersion compensation (both for chromatic and polarization mode) in the electrical domain, thus eliminating external dispersion compensation devices, filters, etc. Modems can also adapt the forward error correction coding that is used, as another method to trade-off service rate vs noise tolerance.

In general, the bit rate of the service provided by a modem is proportional to the amount of spectrum occupied, and is a function of the noise tolerance. As shown in the examples of FIG. 4, more bits communicated generally means less noise tolerance.

In addition to the modem 300 functionality, the optimization can be based on the service's need being carried by the wavelength 210. For example, a time-division multiplexed (TDM) service being offered at a fixed capacity may have no requirement to increase its bandwidth. On the other hand, a packet service may need to expand to support more bandwidth, etc. Of course, the packet service could be carried in a TDM service, e.g., Ethernet over ODUflex. For example, in the subset 100a, assume the wavelengths 210-1, 210-2 are carrying a service which does not need additional capacity or the modems 300-1, 300-2, 300-3, 300-5 are incapable of adjusting capacity upwards in the field. Also, assume the wavelength 210-3 is a service that can take advantage of additional capacity, such as by changing the modulation format, increasing baud rate, etc. Again, conventional engineering of the wavelengths 210-1, 210-2, 210-3 focuses on forecast tolerance—will the wavelength 210 work at worst case (e.g., full-fill and under end-of-life operating conditions). In this example, assume the wavelength 210-3 cannot adjust upwards because of the wavelengths 210-1, 210-2, the margin-based optimization systems and methods propose techniques to optimize these wavelengths 210-1, 210-2, 210-3 such that the wavelength 210-3 can use additional capacity at the expense of the margin of the wavelengths 210-1, 210-2.

Figure 4:
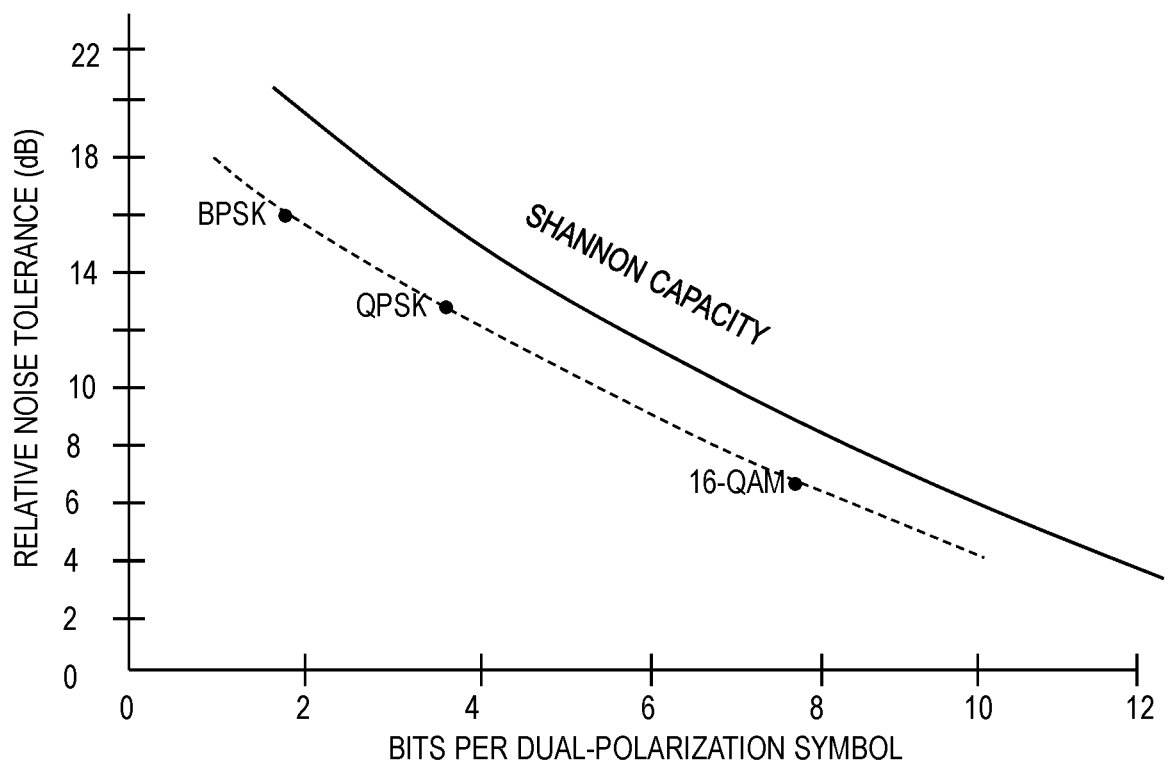
FIG. 4 is a graph of three exemplary configurations of an optical modem showing relative noise tolerance (dB) versus bits per dual polarization symbol.

Referring to FIG. 4, in an exemplary embodiment, a graph illustrates three exemplary configurations of the modem 300 showing relative noise tolerance (dB) versus bits per dual polarization symbol. Additionally, a line illustrates the Shannon capacity. For illustration purposes herein, the modems 300 are assumed to support 50 GB/s with BPSK, 100 GB/s with QPSK and 200 GB/s with 16QAM, all with the same hardware, i.e. software provisionable. Also, as described above, the modems 300 can achieve other rates such as in-between 50 GB/s, 100 GB/s, and 200 GB/s as well as below 50 GB/s and above 200 GB/s. This is illustrated with a dotted line in FIG. 4.

The modems 300 can include coherent receivers which require no optical dispersion compensation or optical filters (multiplexers and demultiplexers). Also, the modems 300 can support advanced Performance Monitoring (PMs) for feedback such as Bit Error Rate (BER), Polarization Dependent Loss (PDL), Polarization Mode Dispersion (PMD), and the like to provide accurate modeling of optical characteristics. The modems 300 include coherent transmitters which can provide spectral shaping allowing for more efficient spectrum use and flexible grid placement. Also, the coherent transmitters support software selectable modulation format, providing more bits/s/Hz.

Wavelengths that are spaced closer together provide improved spectral efficiency, as discussed. However, non-linearities such as Cross-Phase-Modulation (XPM) generally cause greater degradations when there is less channel separation for walk-off. This will reduce the capacity of each channel. As described herein, a channel or optical channel refers to the medium, including switching, filters (WSSs), etc., which are set up in a network to carry a signal or optical signal between two points. A signal or optical signal refers to light having been modulated to carry information which traverses the medium within the channel. Also, a wavelength is sometimes used to mean signal or optical signal. Note, sometimes the term channel is equated to a signal or wavelength, through an implied one-to-one correspondence. The term superchannel, as used herein, is used to mean multiple signals traversing a single channel. Superchannel can also be used to refer to a channel, typically wider in frequency than is normally used for one signal, which carries multiple signals.

A higher power in a given signal (wavelength) will improve its optical signal to noise ratio (OSNR). However, higher powers also cause stronger nonlinear effects which are generally degradations to the signal itself and to other signals. Optical amplifiers, or other optical elements, may limit the average total output power from that element.

At a given power, a higher Baud rate signal will generally cause less XPM. The modulation applied to the signal can be designed to induce less nonlinear degradation in the other signals present on the fiber, generally at a cost of a portion of the bitrate or noise tolerance of that modulation.

Depending upon the type of fiber, and any optical dispersion compensation present, higher Baud rates or lower Baud rates will be advantageous for minimizing self phase modulation (SPM), at a constant composite average power level.

Some kinds of fibers, such as Dispersion Shifted (DS) fiber generate severe degradations due to Four Wave Mixing (FWM), as a strong function of the wavelength locations relative to the fiber dispersion zero.

The separation between channels can be squeezed to be less than the Baud rate, and the inevitable resulting linear intersymbol and interchannel interference reduces the system margin. DSP methods such as MLSE or multiple channel co-detection can be used to mitigate some of this reduction. Optical CDMA methods attempt to superimpose multiple wavelengths onto the same spectrum.

Metrics

Figure 5:
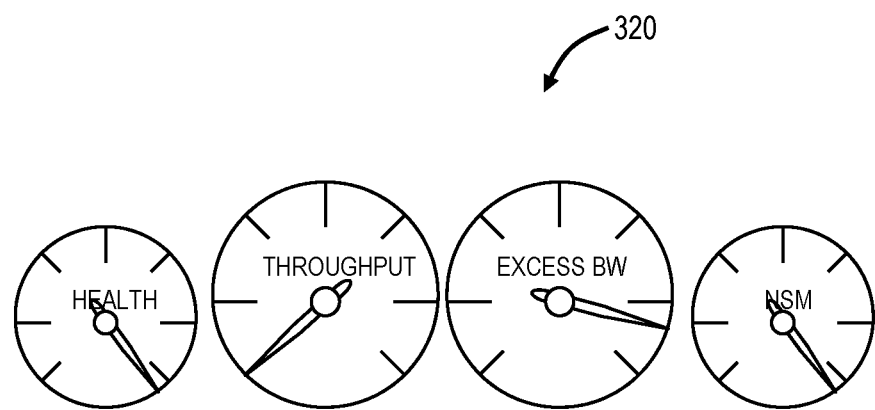
FIG. 5 is a diagram of a dashboard with metrics associated with an optical network.

Referring to FIG. 5, in an exemplary embodiment, a diagram illustrates a dashboard 320 showing metrics associated with the optical network 100. The margin-based optimization systems and methods require various metrics to determine where optimization is needed. With the modems 300, an associated controller communicatively coupled to the modems 300 is configured to compute real-time margin, an estimation, prediction, and/or calculation, showing nonlinear impairments, link loss, dispersion, error rates, etc. This information is provided to the photonic control 150 and/or the SDN controller 160. The photonic control 150 uses the information to set associated parameters including per channel power, amplifier gain, etc. An associated SDN application can be used to adjust and optimize various optimization metrics to see how noise can be allocated in the network 100 to improve capacity.

The dashboard 320 can be implemented in the SDN application, an EMS, an NMS, etc. to provide instant feedback on the state of the network 100 based using the various optimization metrics. In this exemplary embodiment, the dashboard 320 presents four metrics—health, throughput, excess bandwidth (BW), and Net System Margin (NSM). Health gives an operator a view of non-blocked restoration paths, how resilient the network 100 is to failures, and restorability in the network 100. Throughput shows how much data is being transported in the network 100, i.e. how much client traffic. The excess bandwidth shows how much excess capacity is available, e.g. if only 10 GB/s is provisioned on a 100 Gbs line, there is 90% excess.

The margin-based optimization systems and methods can include a Net System Margin (NSM). Note, even in a "critically" designed network, it is normal to have excess margin since the network is designed for full-fill, end of life, fixed modulation formats, safety margin (user defined with such things as fiber repair and ageing etc.), etc. (i.e., forecast tolerant). Of note, most of a network's life is spent in a condition which has fewer wavelengths and fewer impairments. Therefore, there is extra margin in most operating conditions and this extra margin can be mined to turn it into capacity to support even more revenue generating services. The NSM shows the operator a view of the excess margin available in the network 100. The NSM can be dB/OSNR and provide a view of how much more noise can be handled until the FEC limit. As an analogy, NSM can be viewed as gas in an automobile gas tank. If there is leftover gas, the automobile (the network 100) can still travel further.

Guaranteed capacity can be defined as that amount that would be present under worst-case, end of life, full fill conditions, and Excess capacity is defined as the amount of additional capacity which can be achieved "right now" with acceptable margin. With the margin-based optimization systems and methods can include a throughput=total of Guaranteed+Excess; Excess BW=amount exceeded of Guaranteed (in %).

Optimization Metrics

In various exemplary embodiments, the margin-based optimization systems and methods contemplate using various optimization metrics to adjust the NSM such that the throughput is maximized. The various optimization metrics can be viewed as "knobs" which can be turned having an associated effect on the dashboard 320. The optimization metrics include anything that is adjusted with the modems 300 and/or the photonic control 150. The optimization metrics can be applied to a single wavelength, multiple wavelengths, and/or all wavelengths, and different techniques can be applied to different wavelengths.

The following is a non-limiting exemplary list of optimizations:

Increasing/Decreasing launch power
Modifying wavelength
Modifying modulation format including, for example, changing the coding, shaping, power balance, polarization balance, and/or precompensation
Changing precompensation
Increasing/Decreasing spectral width
Increasing/Decreasing spectral shape
Increasing/Decreasing spectral spacing
Adjusting wavelengths across an interconnected mesh for optimization
Creating superchannels
Adjusting amplifier and/or VOA settings
Changing baud rate (which also could change the spectral width, but does not have to)
Changing FEC parameters (more FEC overhead increased performance, but lowers client data rate)

The margin-based optimization systems and methods contemplate using any of the above, individually or in combination, to make adjustments to increase throughput.

A good metric captures what is important to the customer in their particular optical network, and is amenable to optimization as discussed below under "Algorithm". For example, metrics can be discrete, piece-wise continuous, or differentiable. Examples of applicable metrics:

Point-to-point Capacity
In-service
In-service capacity+equipped capacity
In-service+equipped+allocated
Point-to-point Available Capacity equipped capacity
equipped capacity+allocated spectrum
% of total capacity
% of in-service capacity
Point-to-point Hidden Capacity, i.e. capability to increase the number of bits per Baud.
equipped wavelengths
equipped wavelengths+allocated spectrum
% of total capacity
% of in-service capacity
Point-to-point Spectrum
In-use, allocated, planned, unallocated
GHz, slots, channels, or in units of WSS granularity
Weighed by OSNR and nonlinearities present
Point-to-point optical power
% of allocation is in-service
Point-to-point margin under present conditions
Minimum across designated wavelengths
Minimum across each type of modem
Average
Surplus above a threshold (being tradable)
Sum of tradable margin across all wavelengths
Margin in dBs of system gain
Margin in capacity relative to Shannon capacity
Margin in mW of signal power
Margin at EOL (End of Life)
Margin under near-term conditions
Pre-FEC BER
Log-likelihood-ratio histogram into soft FEC
Amplified Stimulated Emission (ASE) and nonlinearities; Separate or together.
Additive equivalent, in dB relative to signal
Micro Watts
Cost
Equipment count
Equipment price
Heat
DC current
Shelf Space
Floor Space
Latency
Availability
Capacity-Distance product
Gigabit-kilometers
Gigabit-line amps
Gigabit-dB of attenuation in line
Gigabit-WSS
Margin-Distance product
dB-kilometers
dB-dB
Combined metrics for a mesh network
Average
Minimum
Maximum
Min-max
Median
Average of median fraction
Length**alpha weighted average
Calculate across all wavelengths that share any part of a path with this set of wavelengths
Calculate for network subset, with subset choice based upon criteria such as length or fill.
Dilating scope across network
Use only shortest path (kilometers or cumulative metric)
Use Working, Protection and Restoration paths
Redial availability
Resilience to failures
Blocking events
Blocking probabilities for future demands
Pinch point fill ratio
Number of pinch points
Metrics for future demands, such as expected length relative to the shortest path.
Subdividing end-to-end metrics into portions
Allocation per segment between WSS
Allocation per cable between Erbium-doped Fiber Amplifiers (EDFAs)
Subdividing into metrics which can then be summed across the length of any route to get the end-to-end metric.

As described herein, each of the aforementioned optimization metrics is software configurable in the network 100 with the photonic control 150 and/or the SDN controller 160. The question now becomes—what settings are best in the network 100 based on current conditions to maximize the throughput to consume excess NSM. Again, note the network 100 is ultimately a nonlinear analog system and changes made to one wavelength effect other wavelengths. This requires algorithms for rebalancing as described herein.

There are some tradeoffs in the margin-based optimization systems and methods such as: adding more channels requires more margin—lifetime effect in the network, but can be exploited when not at full-fill; channel packing—decreases margin, increases capacity, decreases flexibility (whole band superchannel—e.g. submarine and point-to-point); mesh demands with superchannels (same A-Z paths for each superchannel)—increases flexibility, increases capacity compared to fixed grid, requires fewer guard bands than fixed grid; modulation format—increases capacity, requires more margin; and margin based optimization, e.g., changing launch power—changes impact on neighboring channels.

Figure 6:
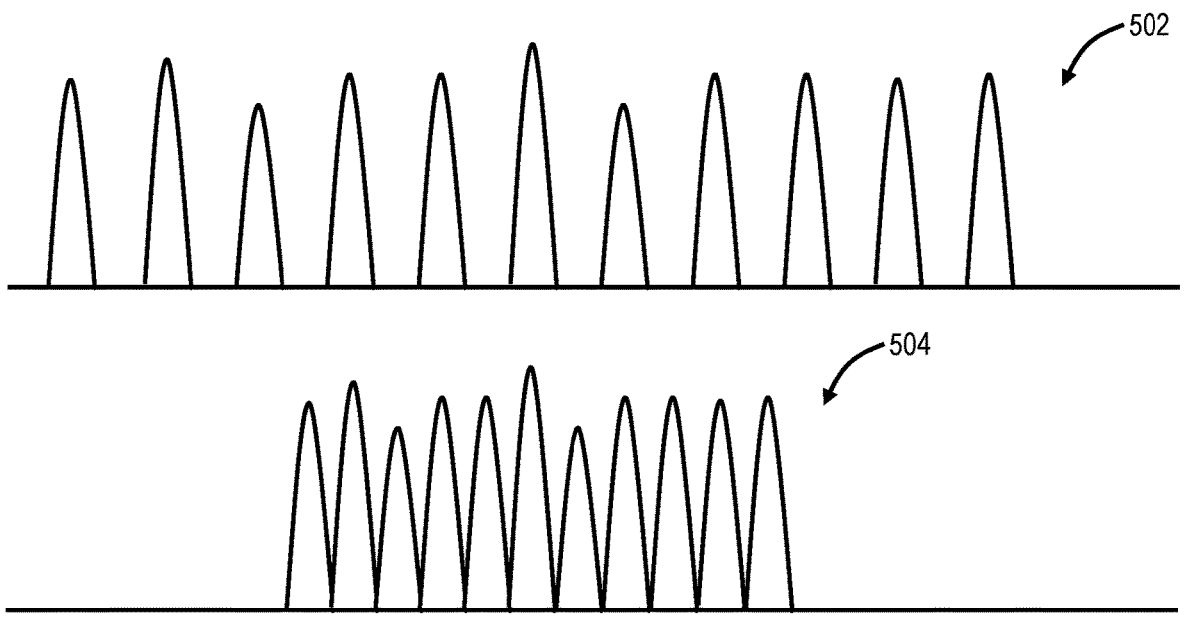

Referring to FIGS. 6-10, in various exemplary embodiments, spectral plots logically illustrate some of the optimization metrics of channels/wavelengths. FIG. 6 illustrates two spectrums 502, 504. The spectrum 502 can be a fixed grid or a flexible grid/gridless spectrum with more frequency separation between adjacent channels and hence higher OSNR with excess NSM. The flexible grid or gridless spectrum allows for more dense packing of channels, but comes at a cost to margin due to channel interference, i.e., can pack channels closer together, but the wavelengths cannot go as far, and can reduce their power to reduce interference, but not below the required OSNR. Specifically, the first spectrum 502 illustrates channels with more frequency separation and hence higher OSNR whereas as second spectrum 504 illustrates the same channels packed denser with lower OSNR. The second spectrum 504 can be a fixed grid or a flexible grid/gridless spectrum with less frequency separation between the channels.

Figure 7:
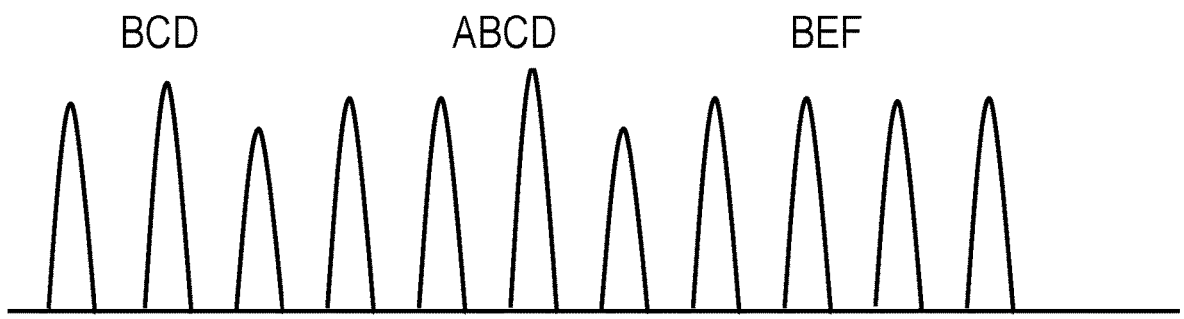
Figure 7:
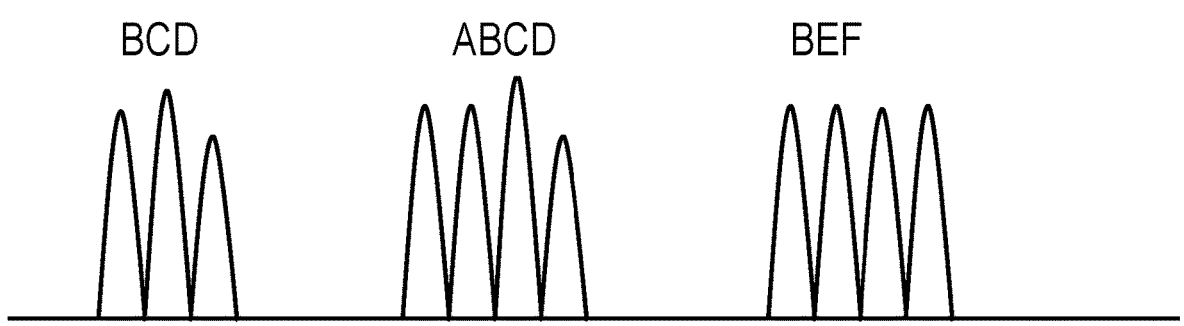

FIG. 7 illustrates minimization of filters, i.e., even in flexible grids, filters introduce dead bands and unused spectrum, but this reduces flexibility of channel paths through the network, which forces wavelengths that share a common path to use the same part of the spectrum in order to get the benefits—"express lanes" or superchannels, and if allowed to "overshoot" a destination by staying on an express lane too long, it takes more "gas" to come back to where it is needed.

FIG. 8 illustrates flexible modulation—in order to pack more bits in the same amount of spectrum, need to be able to vary modulation formats to pack more bits per baud, but this also comes at a cost of margin in the system, such as illustrated in FIG. 4. FIG. 9 illustrates higher baud rates— e.g., one 400 G signals consumes spectrum more efficiently than two individual 200 G signals, but comes at a cost of reduced signals path flexibility, and may need to be go further than needed to reach the destination since the signals are linked electrically. This drives higher overall margin requirements.

Figure 10:
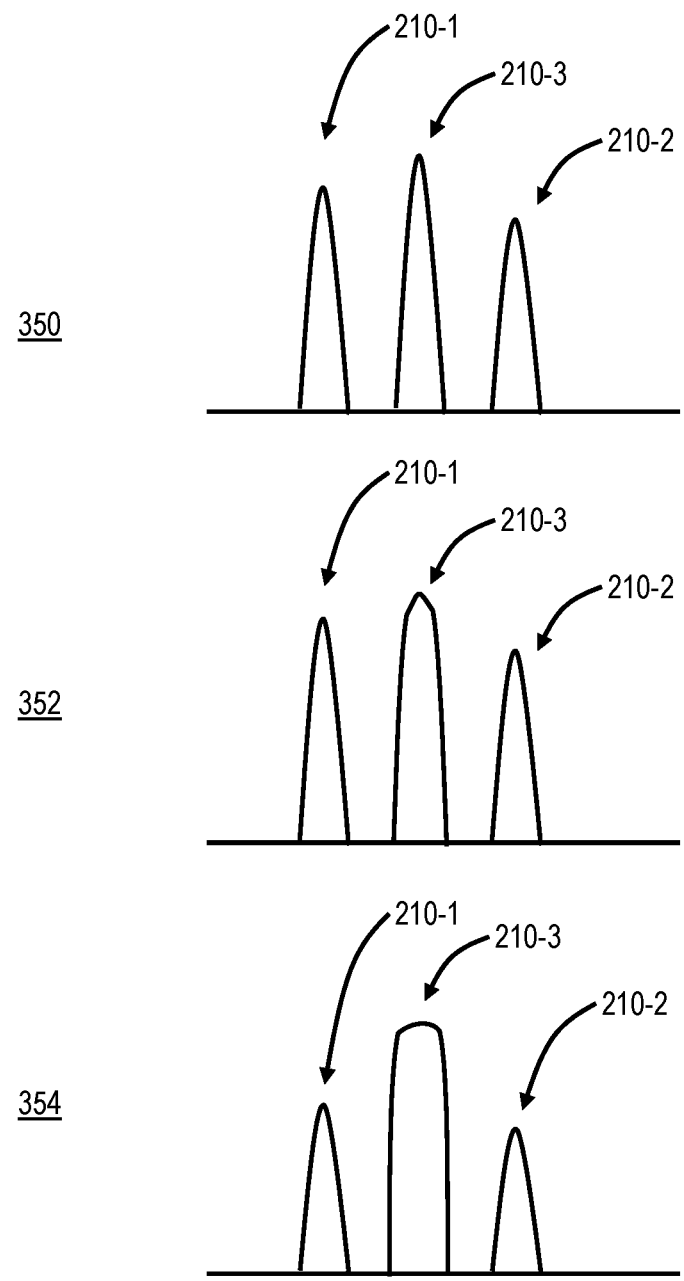

Finally, FIG. 10 illustrates a margin-based optimization process that can use an estimate or measurement of NSM each signal has, and penalize signals who cannot use their margin for the benefit of others. Signals that cannot change modulation format or carry additional traffic should give up margin to signals that can change modulation format or to signals that need or can benefit from excess capacity. In the event of a failure of a signal that is stretched to the limit, attempt to use excess bandwidth in other signals to provide restoration capacity.

For example, assume FIG. 10 includes the wavelengths 210-1, 210-2, 210-3 and FIG. 10 is the optical spectrum for the fiber 200-2. At a first time 350, the wavelengths 210-1, 210-2, 210-3 are provisioned, but not optimized. At times 352, 354, the margin-based optimization is implemented. Again, as described herein, the wavelengths 210-1, 210-2 can have their margins decreased and the wavelength 210-3 can have its margin increased (which can be consumed by increasing throughput on the wavelength 210-3). The time 352 shows an intermediate point in the margin-based optimization, and the time 354 shows an end point in the margin-based optimization.

Margin-Based Optimization Method

Figure 11:
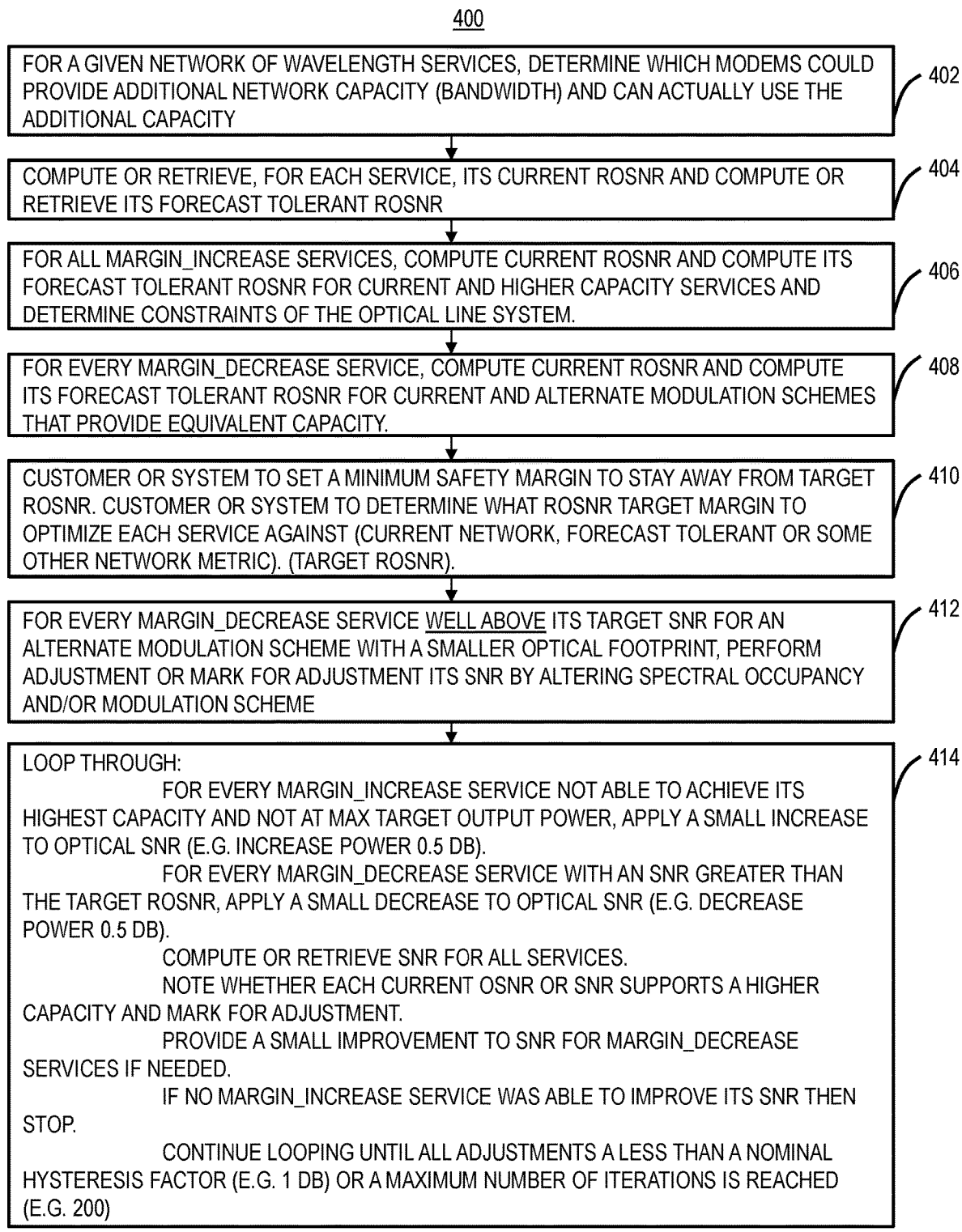
FIG. 11 is a flowchart of a margin-based optimization method.

Referring to FIG. 11, in an exemplary embodiment, a flow chart illustrates a margin-based optimization method 400. The margin-based equalization method 400 can be implemented in the network 100, via the modems 300, with the photonic control 150, the SDN controller 160, etc. as well as in other networks and components. The margin-based equalization method 400 includes, for a given network of wavelength services, determining which of the modems 300 could provide additional network capacity (bandwidth) and can actually use the additional capacity (typically a switched node with packet services, but not limited to a switched node.) Each of the wavelength services is categorized as either margin_increase or margin_decrease (step 402).

Next, the margin-based equalization method 400 computes or retrieves, for each service, its current Required OSNR (ROSNR) and computes or retrieves its forecast tolerant ROSNR (step 404). The ROSNR is the OSNR currently required, based on current network conditions, to provide the service whereas the forecast tolerant ROSNR is the OSNR required, based on worst case network conditions to provide the service. The OSNR measurements can be automatically provided through the modems 300 as described herein.

Next, the margin-based equalization method 400, for all margin_increase services, computes current ROSNR and computes its forecast tolerant ROSNR for current and higher capacity services and determines constraints of the optical line system (step 406). Note, this step can be constrained to compute values only for services the modem 300 can carry as well if it is either system limited or switch limited. Next, the margin-based equalization method 400, for every margin_decrease service, computes current ROSNR and computes its forecast tolerant ROSNR for current and alternate modulation schemes that provide equivalent capacity (step 408).

The margin-based equalization method 400 can include the customer or system setting a minimum safety margin to stay away from target ROSNR, and the customer or system determining what ROSNR target margin to optimize each service against (current network, forecast tolerant or some other network metric) (step 410). In the margin-based equalization method 400, decreasing OSNR can be achieved, for example, by changing optical power, altering spectral occupancy on the spectrum, and/or altering a modulation scheme. Thus, the margin-based equalization method 400 can include, for every margin_decrease service well above its target OSNR for an alternate modulation scheme with a smaller optical footprint, performing an adjustment or marking for adjustment its OSNR by altering spectral occupancy and/or modulation scheme. In the margin-based equalization method 400, improving OSNR can be achieved, for example, by changing optical power, altering spectral occupancy, and/or altering a modulation scheme.

The margin-based equalization method 400 performs a loop which includes: for every margin_increase service not able to achieve its highest capacity and not at max target output power, applying a small increase to OSNR (e.g. increase power 0.5 dB); for every margin_decrease service with an OSNR greater than the target ROSNR, applying a small decrease to OSNR (e.g. decrease power 0.5 dB); computing or retrieving SNR for all services; noting whether each current OSNR supports a higher capacity and marking for adjustment; providing a small improvement to OSNR for margin_decrease services if needed; if no margin_increase service was able to improve its OSNR, then the method 400 stops; and continue looping until all adjustments are less than a nominal hysteresis factor (e.g. 1 dB) or a maximum number of iterations is reached (e.g. 200) (step 414).

If the computed adjustments were performed with an offline tool (not on a live system), then with user intervention or an appropriate interval or time-of-day, the margin-based equalization method 400 can include implementing adjustment of the services. The offline tool can be the SDN application. Also, as demand profiles change or system conditions change, then the margin-based equalization method 400 can be rerun.

Optimization Application and Exemplary Operation

Figure 12:
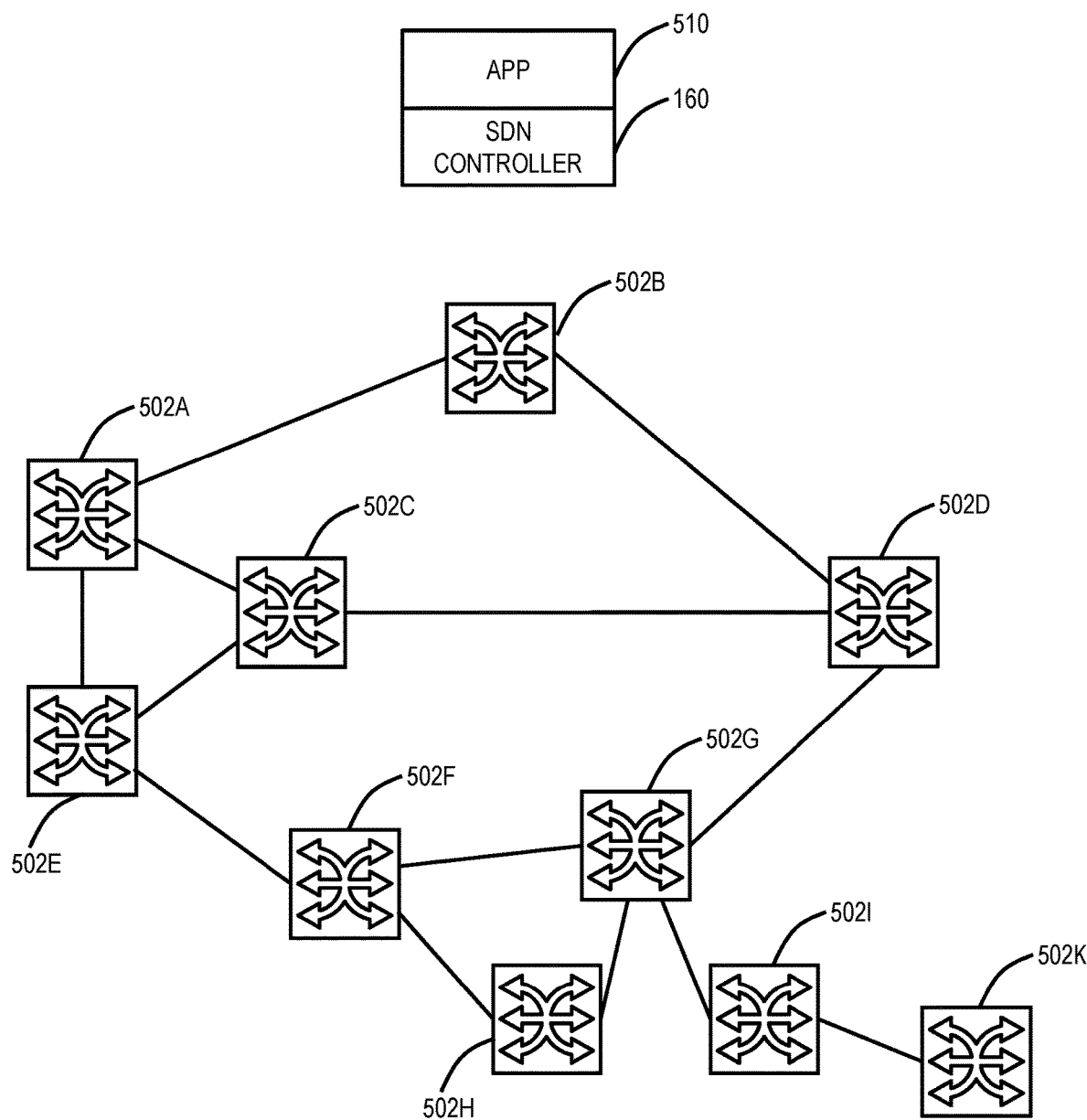
FIG. 12 is a network diagram of a network with an interconnected photonic mesh of nodes.

Referring to FIG. 12, in an exemplary embodiment, a network diagram illustrates a network 500 with an interconnected photonic mesh of nodes 502A-502K. The nodes 502A-502K can be communicatively coupled to the SDN controller 160, and an application 510 can be communicatively coupled to the SDN controller 160. The nodes 502A-502K can include WDM functionality with the modems 300, ROADMs, etc. described herein. Data associated with photonic control 150 and margin measurements is provided from the nodes 502A-502K to the SDN controller 160, and the SDN controller 160 can provide the data to the application 510. Note, the nodes 502A-502K can be actually deployed nodes or simulated nodes. The application 510 is an SDN application which can perform the margin-based optimization described herein to monitor metrics, provision services (through the SDN controller 160), adjust capacity and launch powers to demonstrate the tradeoffs with the various optimization metrics, and the like.

Figure 13:
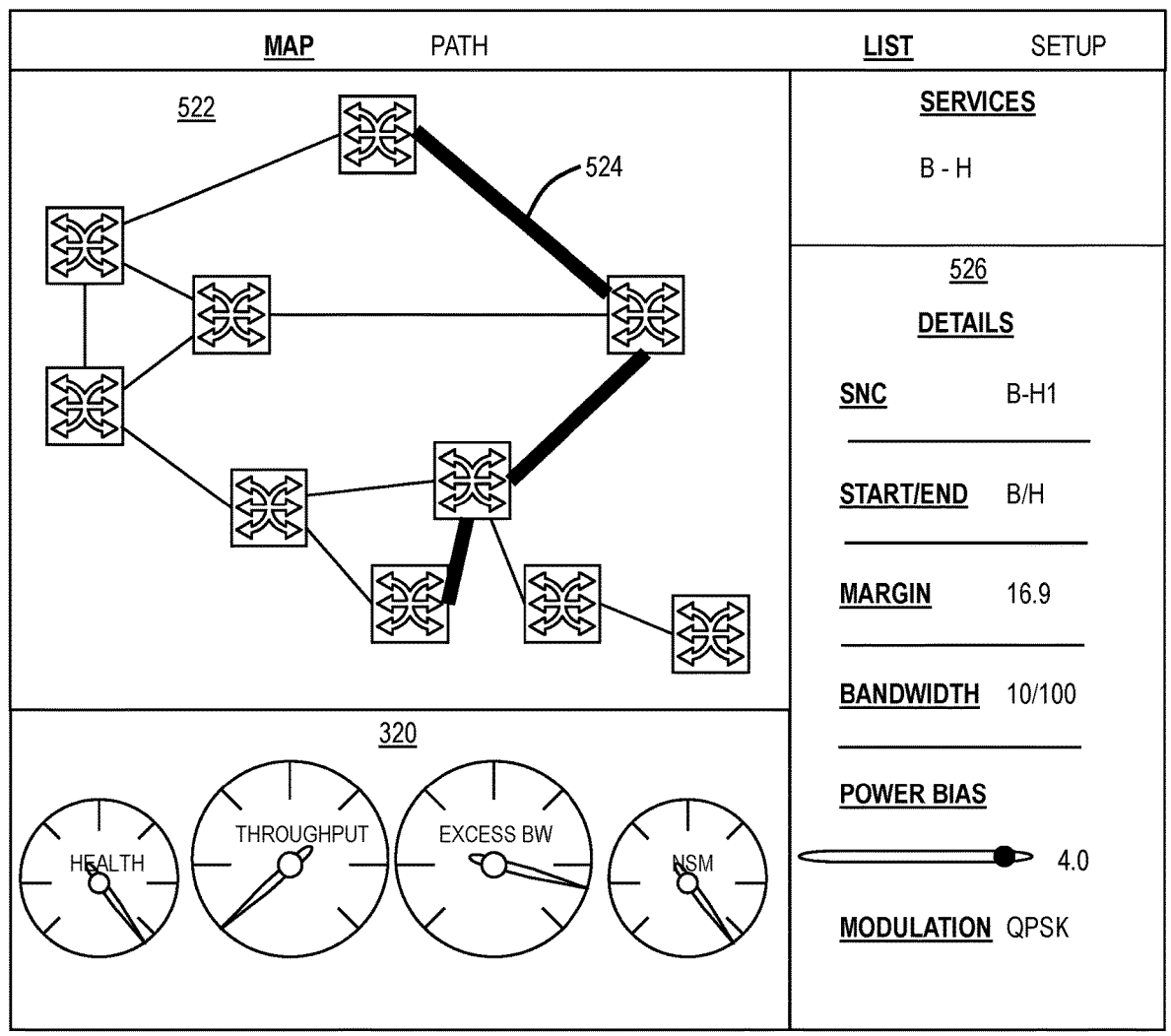
FIGS. 13-21 are various screens of operations with an application using the network of FIG. 12 for optimization thereon.
Figure 14:
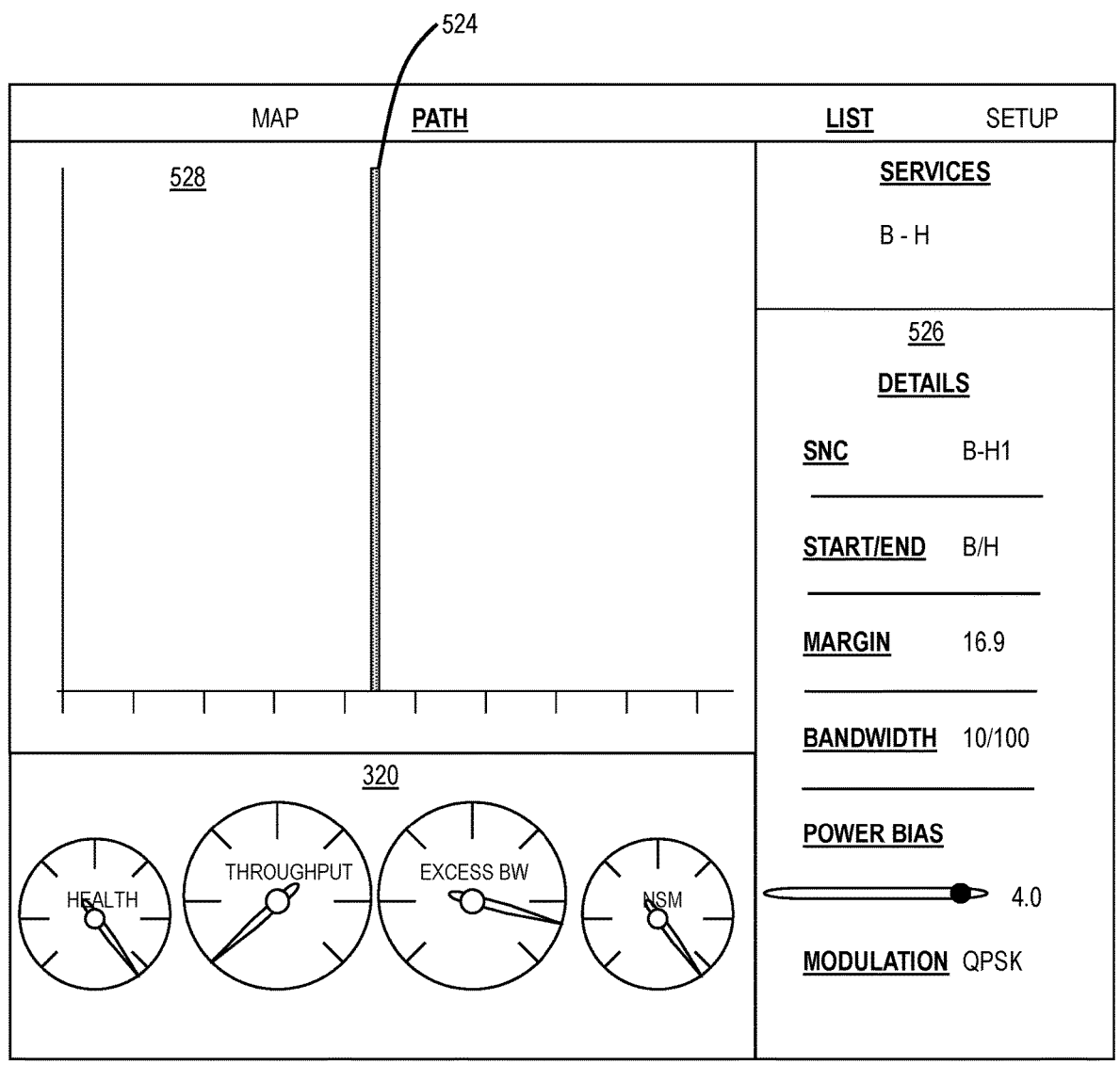

Referring to FIGS. 13-21, in exemplary embodiments, various screens 520-1-520-9 illustrate an operation with the application 510 on the network 500. In FIG. 13, the screen 520-1 illustrates the network 520 (in a map insert 522) and a service 524 provisioned between the nodes 520-B, 520-H. The application 510 provides details 526 of the service 524 including, for example, Subnetwork connection (SNC) description, start/end node, margin (16.9 in this case), bandwidth (10 GB/s used out of 100 GB/s), power bias (currently set at 4.0), and modulation type (QPSK). Additionally, the application 510 can display the dashboard 320 which shows, in the case of the service 524, that the network 500 is healthy, has a low throughput, a lot of excess bandwidth (10/100), and very high NSM. FIG. 14 illustrates a path insert 528 showing a visual representation of a wavelength associated with the service 524. Note, the visual representation can be color coded to show that the wavelength has significant NSM.

Figure 15:
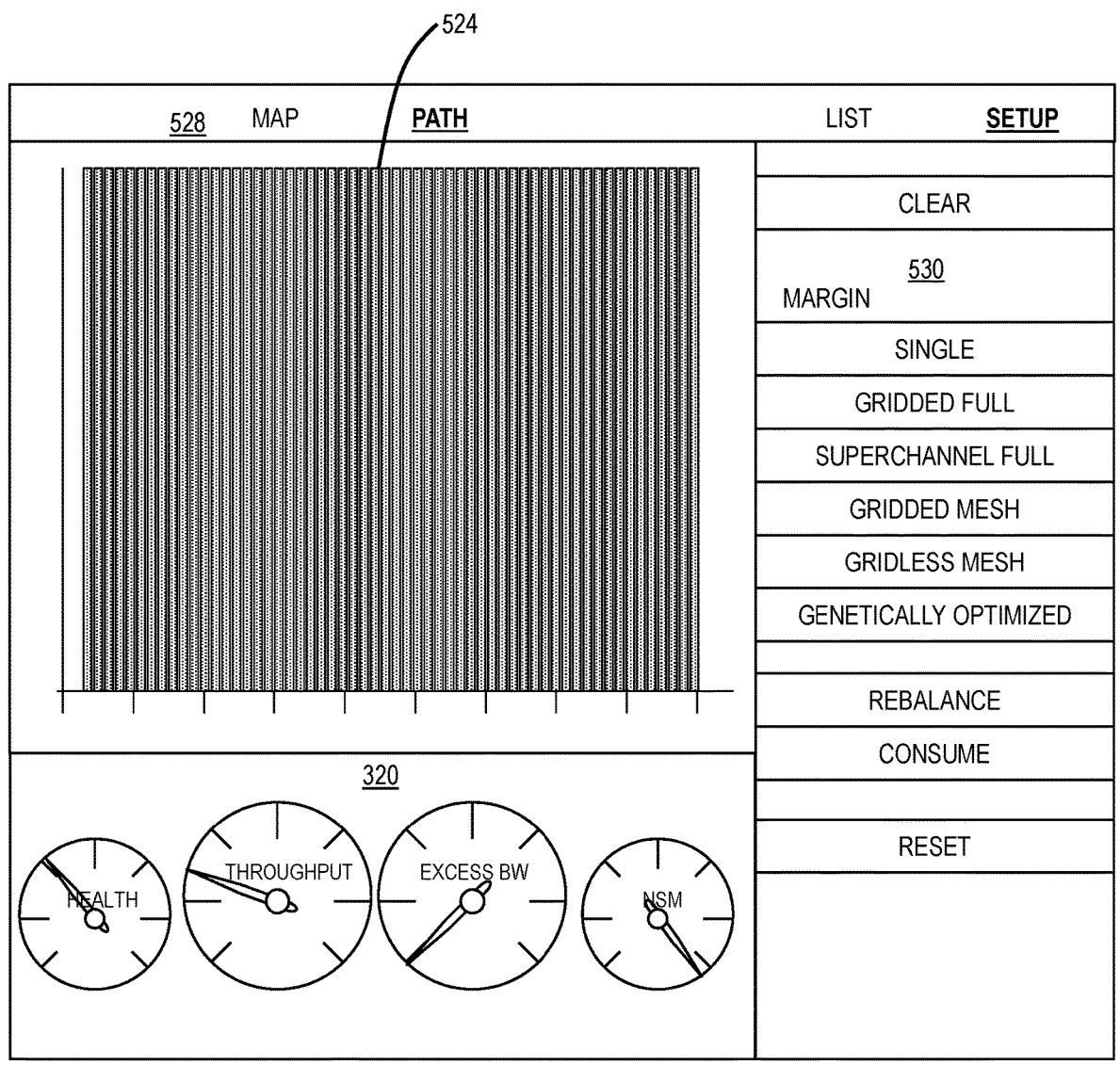

FIG. 15 illustrates a screen 520-3 with a setup insert 530 which includes various options for optimization. These options can include, for example, a single channel optimization, a gridded full optimization, a superchannel full optimization, a gridded mesh optimization, a gridless mesh optimization, and a genetic algorithm optimization. The single channel optimization determines an optimization for a single signal. The gridded full optimization determines an optimization for all signals, on a same A-Z path, with each of the signal occupying a channel on the spectral grid. Note, the screen 520-2 in FIG. 15 illustrates a gridded full optimization. The superchannel full optimization provides all signals on the same A-Z path in a superchannel. The gridded mesh optimization takes all A-Z demands in the network 500 and optimizes based on routing signals on the spectral grid through the network 500. The gridless mesh optimization takes all A-Z demands in the network 500 and optimizes based on routing signals gridlessly. Finally, the genetic algorithm optimization determines how A-Z demands should be routed in the network 500 to optimize superchannels, wavelength placing, etc. to avoid blocking/contention and to maximize throughput.

Figure 16:
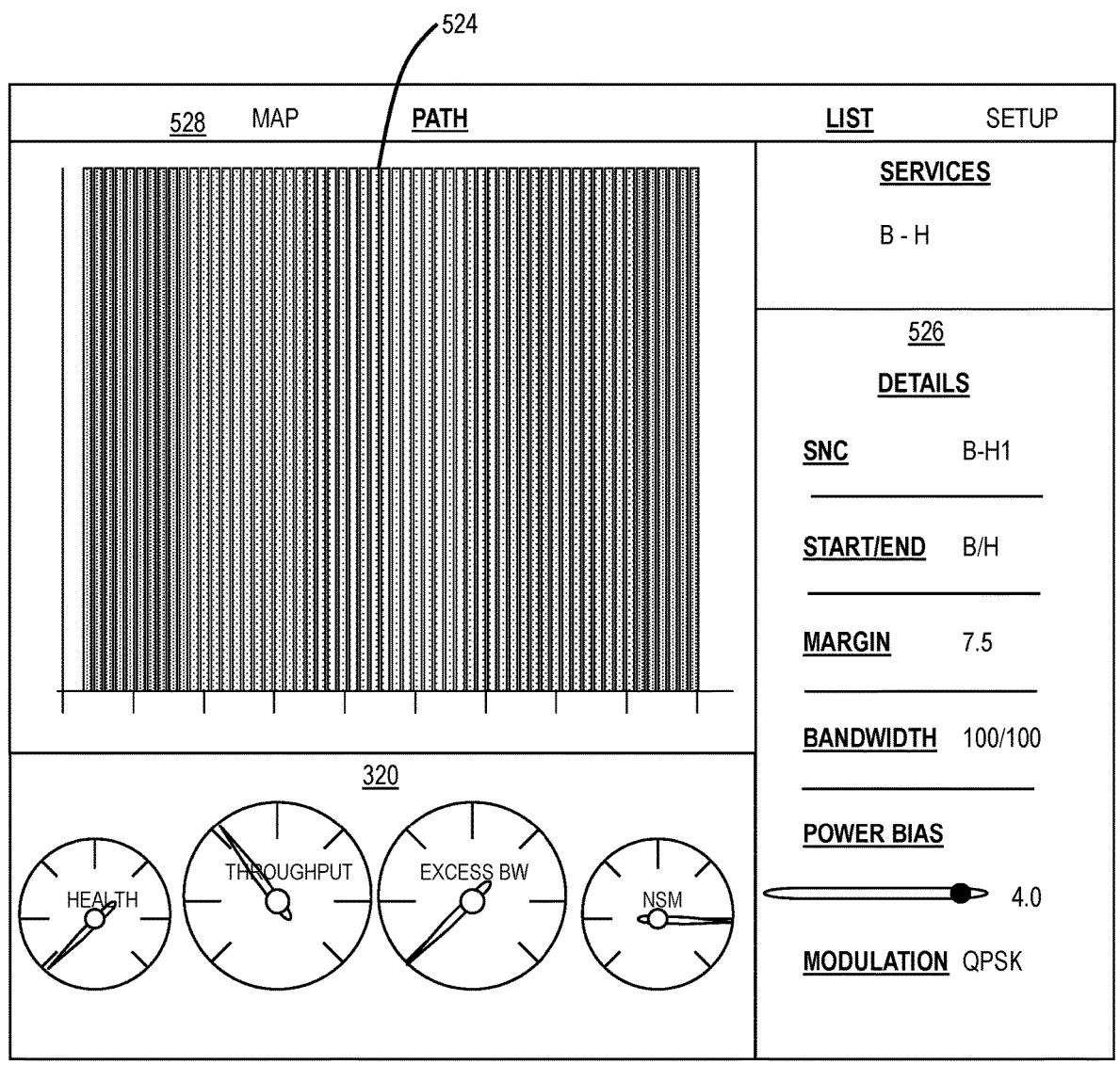
Figure 17:
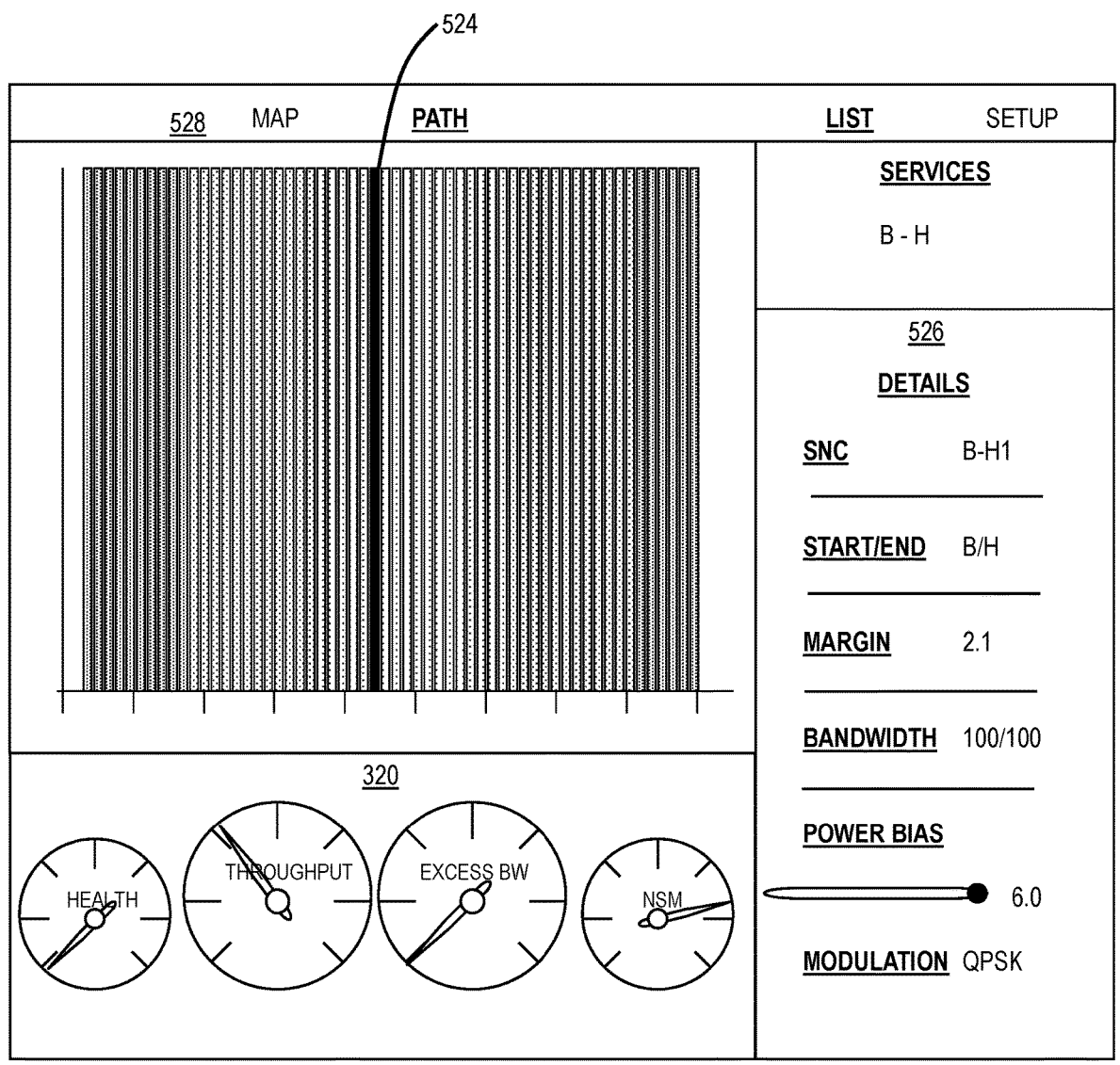

FIG. 16 illustrates a screen 520-4 with the details 526 of the gridded full optimization. Note, the margin, for the service 524, has decreased to 7.5 (from 16.9), the health is low (blocking and no restoration), throughput is higher, there is no excess bandwidth, and NSM has decreased. Note, in the path insert 528, the signals can be color coded to denote associated margins. In the gridded full optimization, there is a decrease in margin due to co-propagating signals, i.e. cross-phase modulation. Also, note that the signals at the edges have higher margins than the signals in the middle due to fewer co-propagating channels. FIG. 17 illustrates a screen 520-5 showing what happens to the server 524 when the launch power is increased from 4.0 dB to 6.0 dB. This 2 dB increase causes the margin to go from 7.5 to 2.1 dB due to self-phase modulation. Also, note the corresponding decrease in the NSM.

Figure 18:
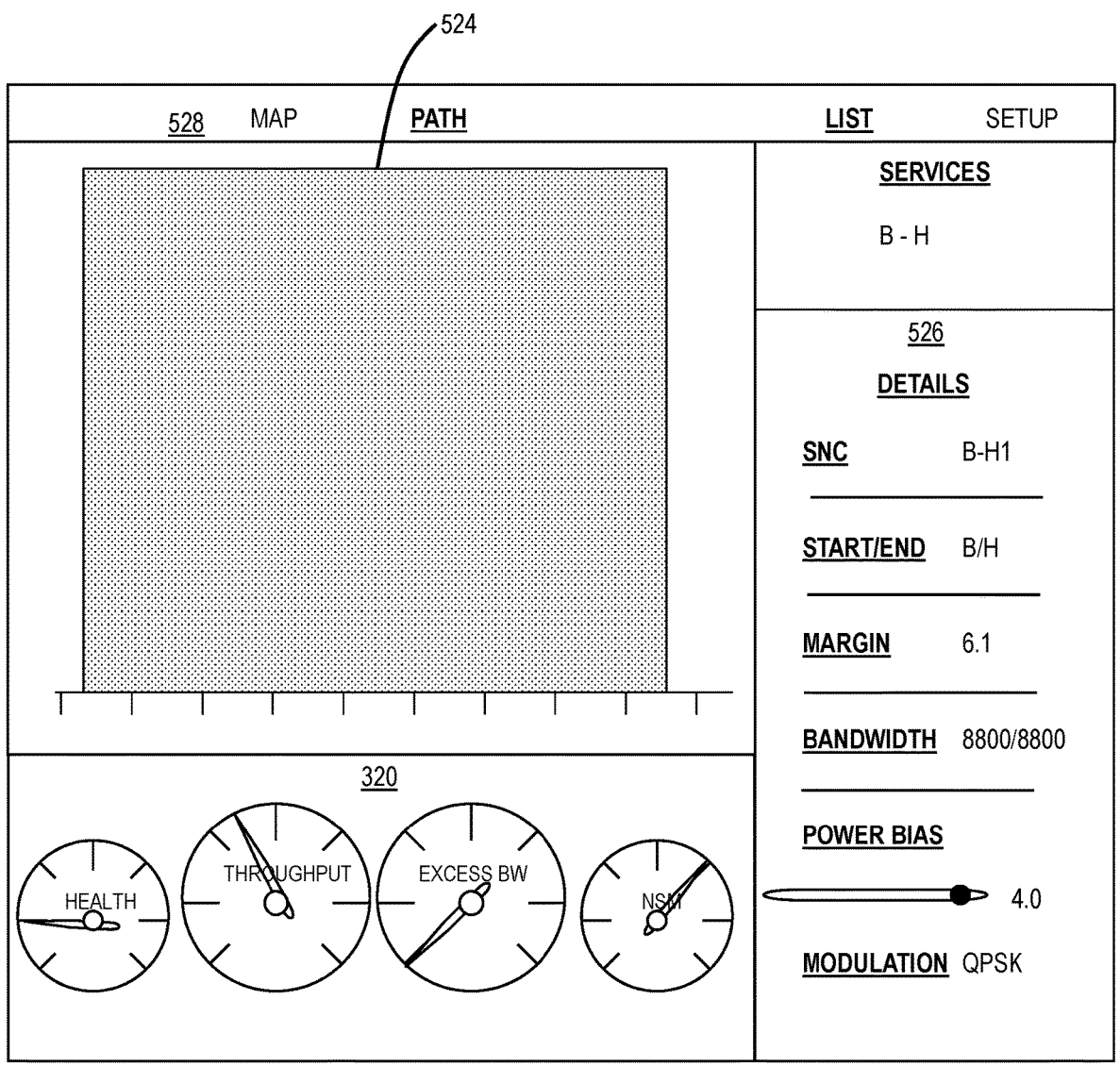

FIG. 18 illustrates a screen 520-6 with a superchannel full optimization of the service 524. Note, in FIGS. 16 and 17, the channels were at 50 GHz spacing. Assuming the modems 300 only need 37.5 GHz spectral width, the superchannel full optimization shows all the signals with 40 GHz spacing, in a superchannel from the service 524. Note, in the dashboard 320, the health has improved because less spectrum is being used, thereby allowing restoration and removing blocking and contention. Also, the bandwidth has increased to 8800 with a slight decrease in margin (6.1 from 7.9) which is acceptable.

Figure 19:
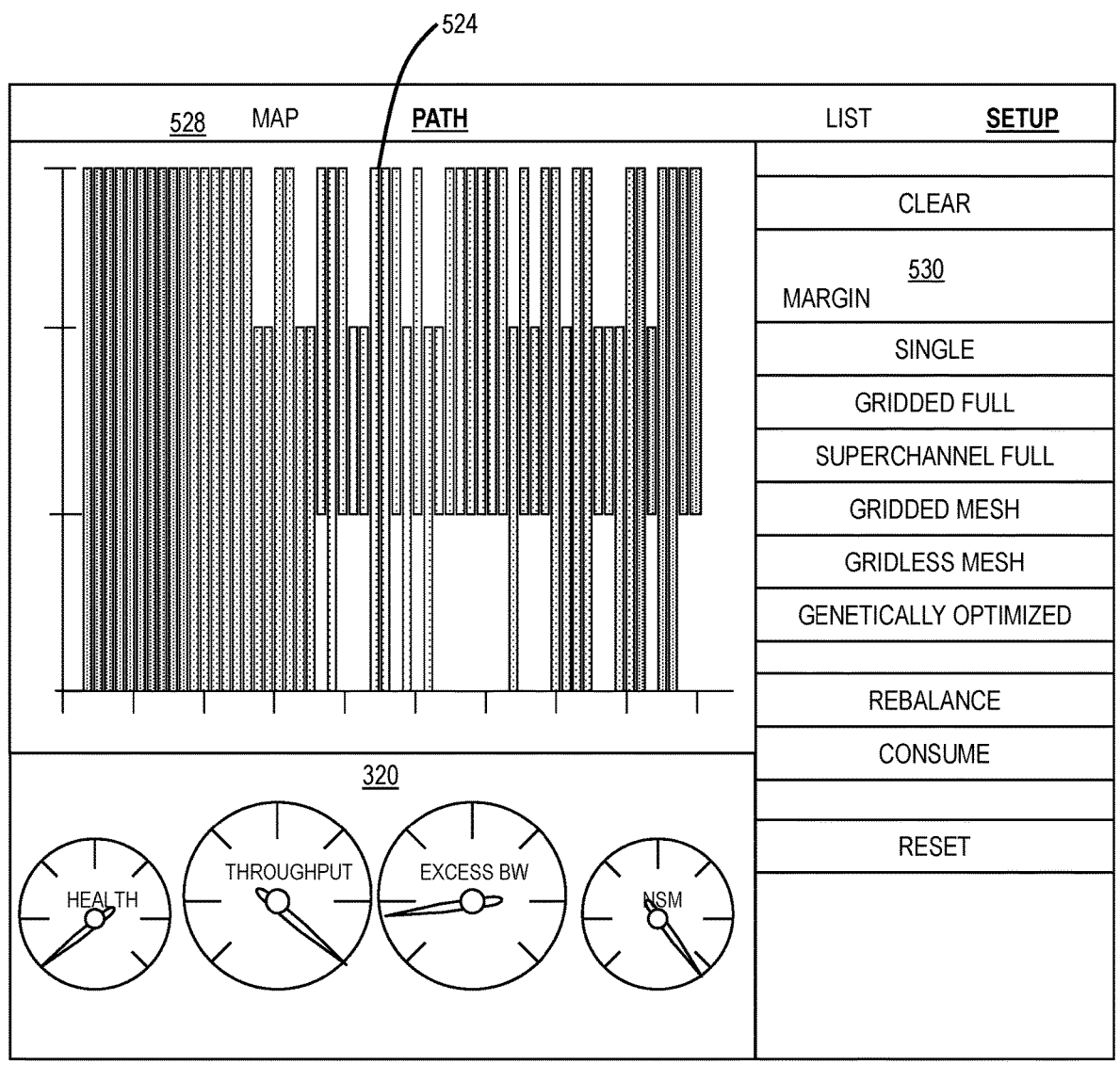

FIG. 19 illustrates a screen 520-7 with the map insert 528 showing the service 524 with a random fill between other nodes 502 in the network 500 in a gridded mesh configuration. Note, traditionally, a first available wavelength is chosen when a new service is provisioned. In the mesh situation such as in the network 500, there is not full utilization due to blocking/contention because of how the wavelengths are filled. The margin is actually quite high for the service 524 here (15.6) as is the NSM, but there is wasted spectrum. Typically, only 60-70% of the spectrum can be used in a mesh configuration until wavelength blocking occurs. One optimization could be to attempt superchannels from the configuration in the screen 520-7. In doing this, throughput can be increased from 26 TB/s (in screen 520-7) to 26.2 TB/s which is not much benefit since other wavelengths prohibit the growth of the superchannels.

Figure 20:
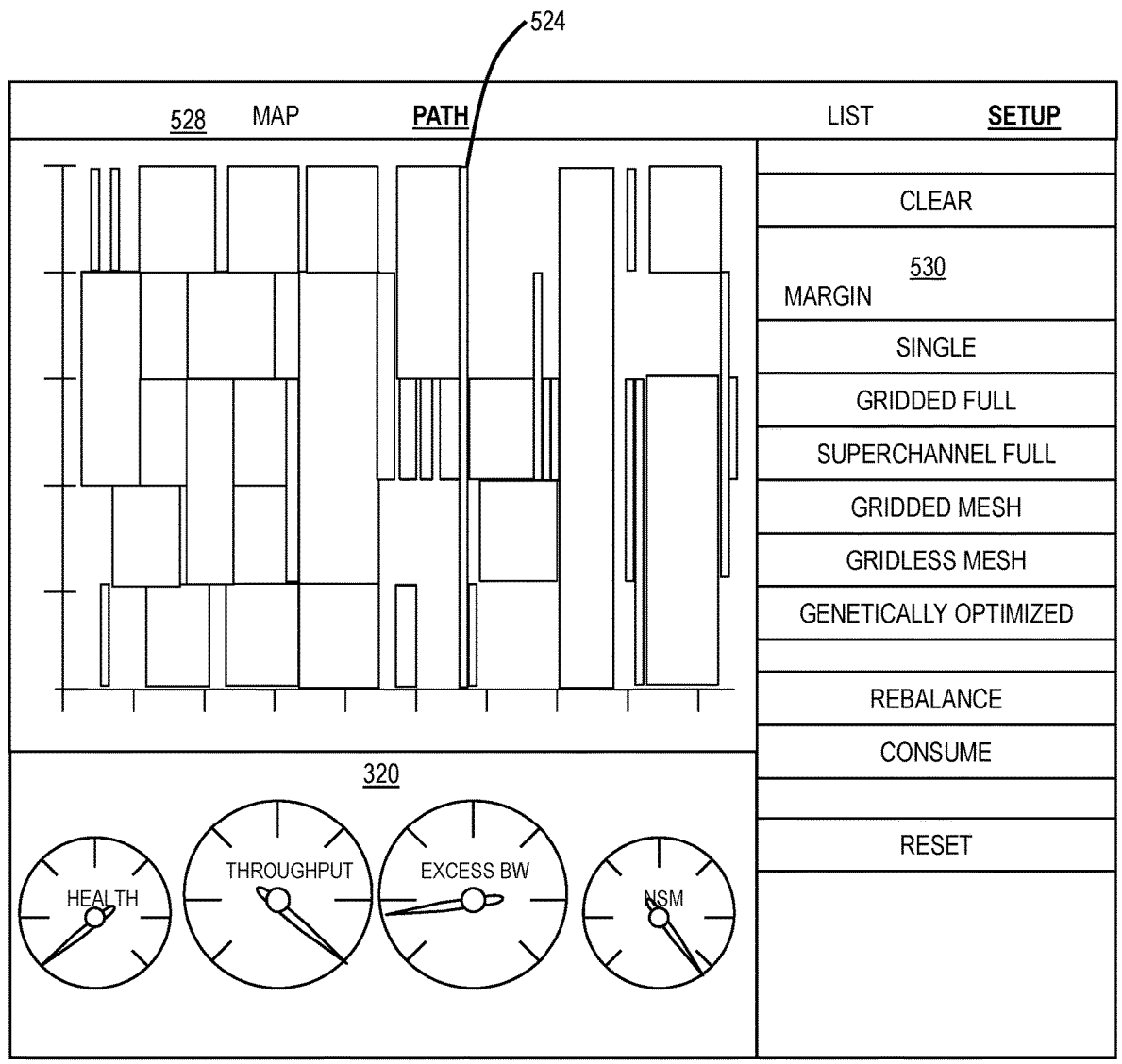

FIG. 20 illustrates a screen 520-8 with the map insert 528 showing results run by a genetic algorithm or the like to optimize the placement of wavelengths, superchannels, etc. in the network 500. The general rule here is to provision services as far away from others as possible to allow growth. Note, there are too many variables for manual optimization by manipulating the optimization metrics. Instead, the genetic algorithm can perform the optimization which yields an increase in throughput to 32.2 TB/s (from 26 TB/s) with high margin and NSM.

Figure 21:
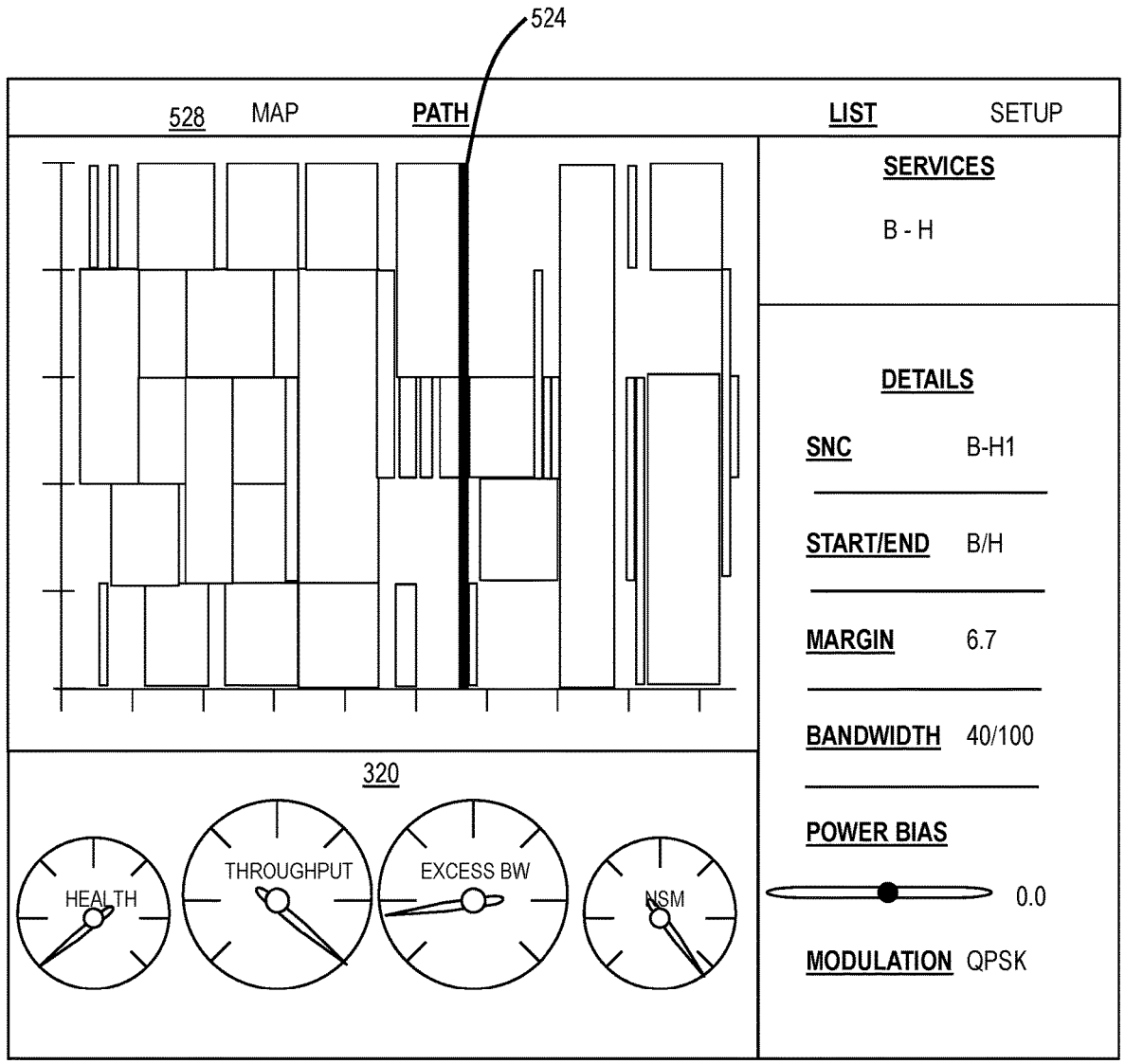

FIG. 21 illustrates a screen 520-9 showing a change in the service 524 from QPSK (100 GB/s) to 16QAM (200 GB/s). Note, at QPSK, the service 524 has a margin of 6.7, but when it switches to 16QAM, the margin drops to 0.05 which is unacceptable. Various techniques can be used to improve the service 524 such as a "Robin Hood" process (stealing from the rich signals to give to the poor). This can include dropping launch power on high margin signals. This can improve the margin on the service 524 from 0.05 to 0.1 which is still unacceptable. Other techniques can be implemented such as rebalancing signals (taking all signals to a nominal margin, such as 4 or 5 dB), repositioning signals (moving wavelengths), creating superchannels, etc. which can get the margin up to 3.0. Note, this is a complicated problem in a nonlinear space where algorithms work best in tackling the problem.

Also, the application 510 can include a consumption algorithm which figures out the best way to convert all signals to the highest modulation format which can increase throughput from 32.2 TB/s to 52.4 TB/s in this example. This provides an added 30 TB/s of traffic without new hardware. This is a significant benefit to service providers.

Figure 22:
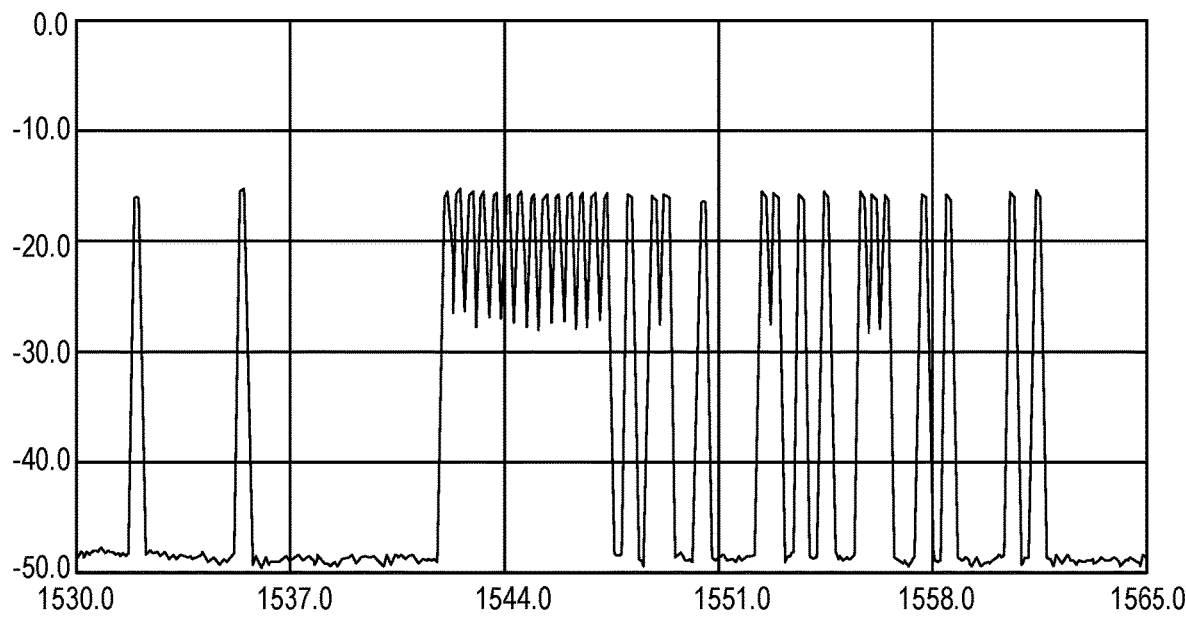
FIGS. 22-23 are spectral diagrams of optical spectrum before and after optimization.
Figure 23:
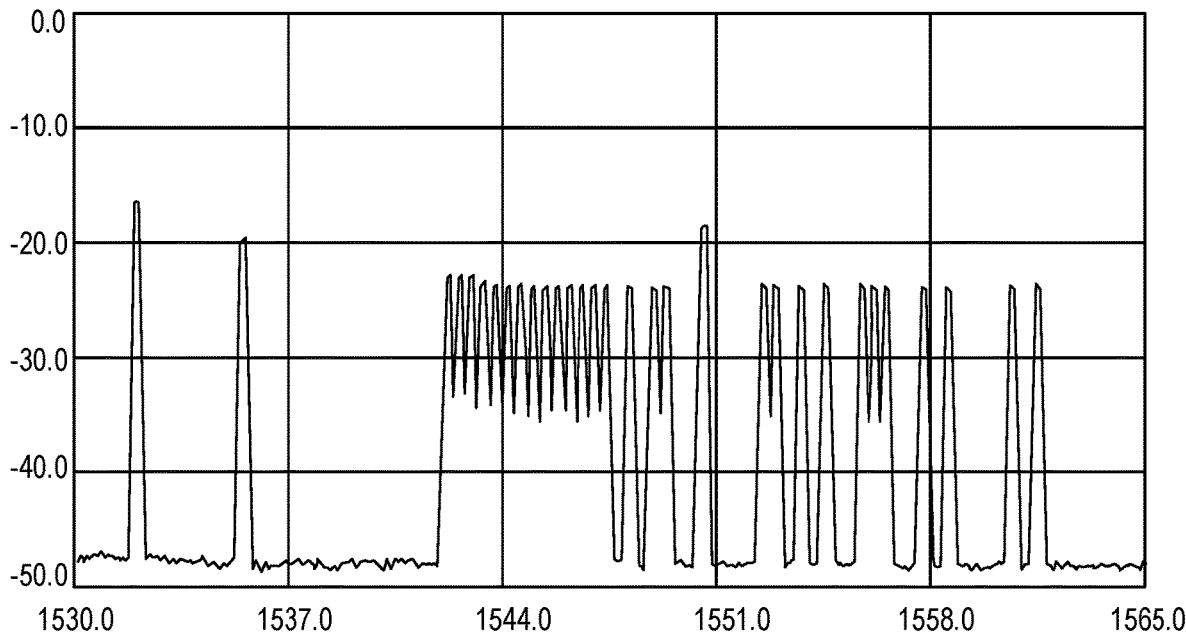

Referring to FIGS. 22-23, in an exemplary embodiment, spectral diagrams illustrate the optical spectrum before (FIG. 22) and after (FIG. 23) optimization. These spectral diagrams illustrate actual snapshots of optical spectrum with various signals that are optimized as described herein. Note, the application 510 can be used to model the optimization, and once it is finalized, the application 510, through the SDN controller 160, can propagate the appropriate commands to the nodes 502 to implement the optimization. In this example, FIG. 22 includes QPSK signals, whereas FIG. 23 includes optimized 16QAM signals which require less power. Note, changing modulation formats is done with a traffic hit, and based on experimentation, it takes several seconds to implement the changes.

Algorithms

The metrics, constraints, and interrelationships can be approximated by linear functions. More generally, they are nonlinear, discrete, or piece-wise continuous. And then there are the optical nonlinear effects.

The margin-based optimization systems and methods can also include optimization of the optical nonlinear effects. The basic idea is to employ a multi-channel, non-linear aware, link modeling routine as part of an objective function for optimization. In addition, one could include the channel capacity as a continuous function (e.g., modem/transponder modeled Shannon Limit) in the objective function. After the optimization, one would then choose the nearest, better margin, option for the modulation/encoding. Once all of the inputs are cast in continuous functions, one can run a non-linear multi-variable optimizer with constraints (e.g., sequential quadratic programming).

Sequential quadratic programming (SQP) is an iterative method for nonlinear optimization. SQP methods are used on problems for which the objective function and the constraints are twice continuously differentiable. SQP methods solve a sequence of optimization sub-problems, each of which optimizes a quadratic model of the objective subject to a linearization of the constraints. If the problem is unconstrained, then the method reduces to Newton's method for finding a point where the gradient of the objective vanishes. If the problem has only equality constraints, then the method is equivalent to applying Newton's method to the first-order optimality conditions, or Karush-Kuhn-Tucker conditions, of the problem. SQP methods have been implemented in many packages, including NPSOL, SNOPT, NLPQL, OPSYC, OPTIMA, MATLAB and SQP.

Convex optimization eliminates the differentiability constraint. Genetic algorithms, and other such heuristics, sidestep the need for analysis of the problem space.

It is often useful in nonlinear optimization to be able to model various system parameters as fully defined real functions. (More precisely: having compact support.) Examples of such are continuous functions and piece-wise continuous functions of real variables; as opposed to only being defined upon integer values. Specifically, modem bit rate, OSNR, even whether or not a signal can support additional capacity, etc. can be chosen to be modeled as real functions. One can transform the nonlinear optimization problem into something which is solvable by a given type of algorithm by expressing all inputs to the objective function in a way that meets the constraints of that method. (e.g. locally convex, piece-wise continuous, differentiable, or doubly differentiable.) A unique aspect here, with the advent of the optical modems described herein, is that one of the inputs is the capacity of the channel using those modems, which approximately follows parallel to Shannon's limit. For the purpose of this optimization, one could just ignore the granularity of the bit-rate adjustment, and transform it to a fully defined real function which can be fed into the optimizer. Then, after achieving a solution, one could just pick the nearest implemented point in the modem.

Depending upon the problem definition and the transformation chosen, optimization methods such as these can be used:

Non-convex methods
Sequential convex programming
Convex-concave procedure
Alternating convex optimization
L1-norm heuristic for cardinality problems
Convex relaxation of permutation problems
Convex methods that may be applicable to sub-problems
Alternating projections
Sub gradient methods for non-differentiable functions
Decomposition for distributed processing
Linear programming
Second order cone programming
Semi definite programming
Geometric programming of posynomials (can be made convex via transformation)
Stochastic programming
Nonlinear programming
Heuristics
Simulated annealing
Evolutionary algorithms (genetic)
Particle swarm optimization
Learning classifier for a neural network
Dynamic relaxation
Hill-climbing Some simplifying assumptions can be made to constrain the inputs to the algorithms such as, for example, no optical dispersion compensation, specific fiber parameters, digital precompensation and post compensation of dispersion, maximum span losses between amplifiers, Erbium-doped Fiber Amplifiers (EDFA) with optional Raman counter-propagating preamplifiers, homogeneous model of the EDFAs including ripple and tilt and ignoring spectral hole burning and polarization hole burning, coherent transmission systems, only consider Self-Phase Modulation (SPM) and Cross-Phase Modulation (XPM)—no cross-polarization modulation or Stimulated Raman Scattering (SRS) that grow along the amplified line on a linear basis rather than on a power basis, digital precompensation to mitigate some of the SPM, complete power control on a 6.25 GHz granularity, the required $E_b/N_0$ (the energy per bit to noise power spectral density ratio) does not change within a product family as a function of Baud rate, wavelengths can be considered as at most two disjoint subsets, set A and set B, with priorities or specs or capacities defined for each, control and transient effects can be lumped into simple margin offsets or can be modeled as a statistical uncertainty on the per channel power, line maintenance, temperature, and aging effects will be ignored, predictions from a model of the margin for unequipped wavelengths have a specified inaccuracy (Gaussian mean zero in dB), measured margin from a deployed signal will have noise and small magnitude discontinuities or hysteresis such as 0.1 dB, and the margin available in any one signal is a function of both the power of that signal and the powers of other WDM signals that share at least part of the optical path. Under these assumptions, the Poggiolini model is a reasonable approximation to the XPM nonlinearity.

There is a fine granularity set of shaped modulations that trade-off capacity vs. Gaussian noise tolerance. Beyond the tolerance to "total Gaussian noise" expressed as $E_b/N_0$, different modulations have different tolerances to phase noise from XPM based upon their constellation. The contribution of XPM to the total Gaussian noise depends upon the carrier recovery bandwidth, which is proportional to the Baud rate. Simplified curves can be provided for this. Different modulations have different levels of aggression as interferers on other WDM signals, as a function of the amount of shaping that is present. Simplified curves can be provided for this.

In an exemplary embodiment, the minimum optical spectrum that one modem signal requires is 8/7 of the Baud rate, and which can be varied from 5 GBaud to 100 GBaud in 5 GBaud increments.

Capacity Boosting Method

Figure 24:
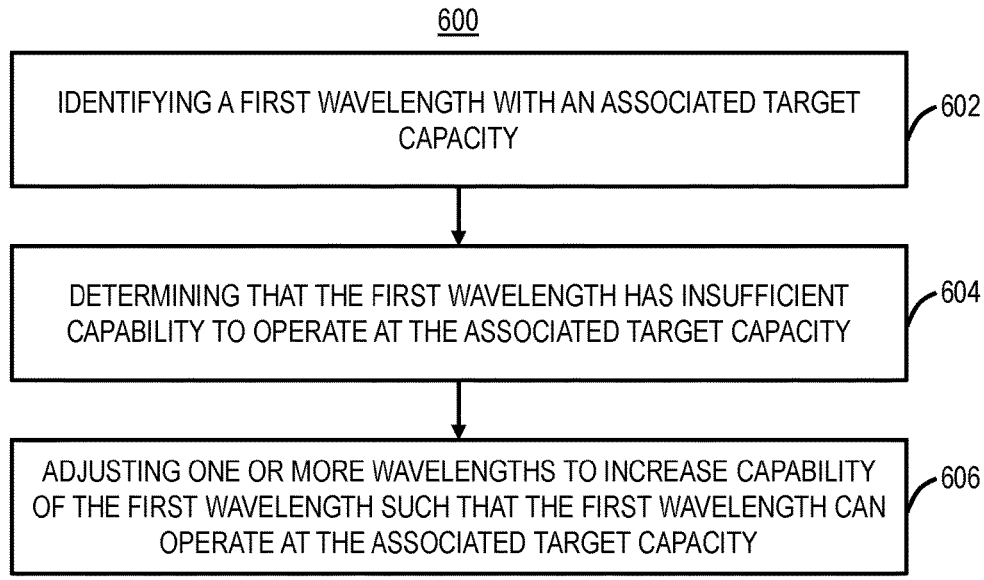
FIG. 24 is a flow chart of a capacity boosting method.

Referring to FIG. 24, in an exemplary embodiment, a flow chart illustrates a capacity boosting method 600. The capacity boosting method 600 is a method of optimizing capacity of an optical network, such as the networks 100, 500. The capacity boosting method 600 includes identifying a first wavelength with an associated target capacity (step 602). The first wavelength can be formed with one of the modems 300 and the associated target capacity can be based on a service being carried by the first wavelength. The capacity boosting method 600 includes determining that the first wavelength has insufficient capability to operate at the associated target capacity (step 604). The insufficient capacity can be determined comparing one or more link parameters associated with the first wavelength to thresholds and deriving the NSM. The one or more link parameters can be any of additive noise, Cross-Phase Modulation, Cross-Polarization Modulation, and spectral width. The one or more link parameters can be measured by a modem associated with the first wavelength or, alternatively, computed or estimated through the application 510.

The capacity boosting method 600 includes adjusting one or more wavelengths to increase capability of the first wavelength such that the first wavelength can operate at the associated target capacity (step 604). The adjusting can utilize any of modifying average power, changing wavelength, changing modulation, and changing precompensation. The insufficient capability can be based on any of noise margin and spectral width. The insufficient capability can be not enough to either presently meet a performance for the associated target capacity or to meet a performance for the associated target capacity at a future time (e.g., next year, next decade, or worst-case network fill over an entire life of the equipment). The adjusting can utilize changing modulation to any of reduce nonlinear aggression, reduce spectral width, and change spectral shape. In an exemplary embodiment, a present capacity of the first wavelength is effectively zero or at least 100 GB/s. In another exemplary embodiment, the associated target capacity is at least 10 GB/s greater or lower than the present capacity. In a further exemplary embodiment, the associated target capacity is approximately equal to the present capacity. The first wavelength can be a preexisting signal that the method is operated on or a recently added or changed signal.

The method can further include performing a nonlinear optimization to determine adjustments to the one or more wavelengths by modeling modem bit rate, Optical Signal to Noise Ratio (OSNR), and whether or not a signal can support additional capacity as real functions in the nonlinear optimization. Optionally, the adjusting is simulated in an application prior to operation on nodes in the optical network. Also, the method can be implemented in a controller or in an optical network.

Robin Hood

Figure 25:
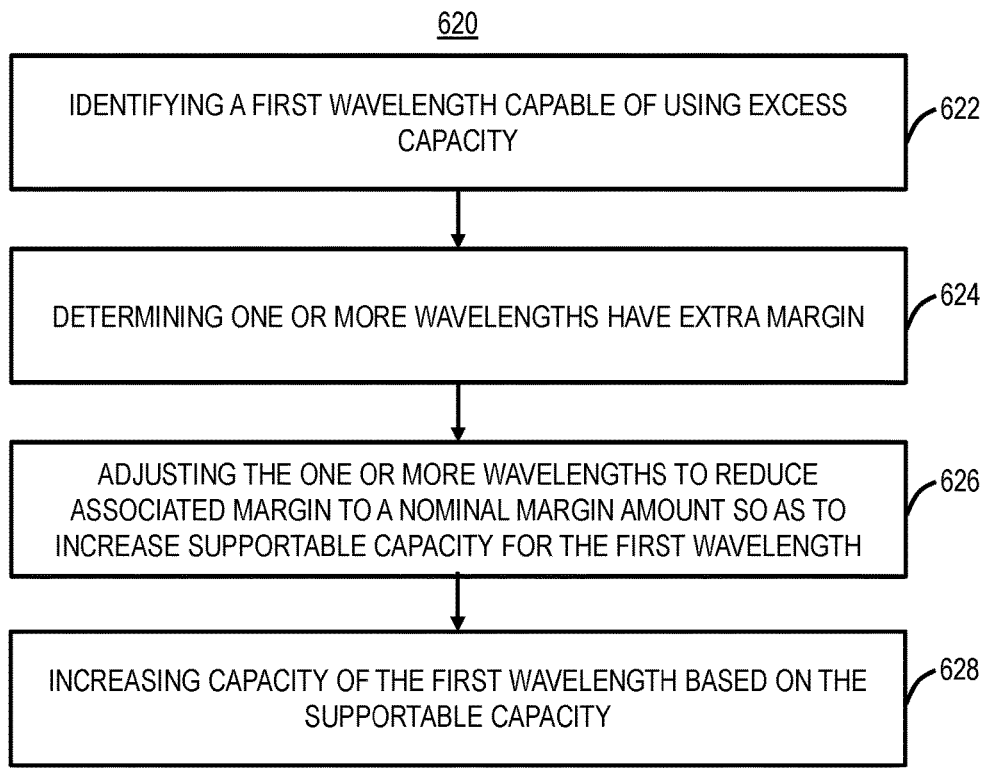
FIG. 25 is a flow chart of a "Robin Hood" method which intentionally reduces margin on wavelengths for the benefit of other wavelengths.

Referring to FIG. 25, in an exemplary embodiment, a flow chart illustrates a "Robin Hood" method 620 which intentionally reduces margin on wavelengths for the benefit of other wavelengths. The method 620 is a method of optimizing capacity of an optical network, such as the networks 100, 500, by "robbing from the rich and giving to the poor" in terms of wavelengths. That is, the method 620 optimizes capacity of an optical network, through intentionally reducing margin on one or more wavelengths. The method 620 includes identifying a first wavelength capable of using excess capacity (step 622). Here, the first wavelength is carrying some service such as a packet service that can use excess capacity. The method 620 includes determining the one or more wavelengths have extra margin (step 624). The excess margin can be based on the NSM described herein. The method 620 includes adjusting the one or more wavelengths to reduce associated margin to a nominal margin amount so as to increase supportable capacity of the first wavelength (step 626). For example, the nominal margin can be 3-5 dB. The method 620 includes increasing capacity of the first wavelength based on the supportable capacity (step 628)).

The adjusting can utilize any of modifying average power, changing wavelength, changing modulation, and changing precompensation. The reduction to the nominal margin can be based on comparing one or more link parameters associated with one or more wavelengths used to derive a Net System Margin. The one or more link parameters can be any of additive noise, Cross-Phase Modulation, Cross-Polarization Modulation, and spectral width. The one or more link parameters can be measured by a modem associated with the one or more wavelengths. The adjusting can utilize changing modulation to any of reduce nonlinear aggression, reduce spectral width, and change spectral shape. The increase in capacity of the first wavelength can be any amount supported by the modem, such as, for example, a factor of two or less, at least 10 GB/s more, etc.

The method can further include performing a nonlinear optimization to determine adjustments to the one or more wavelengths by modeling modem bit rate, Optical Signal to Noise Ratio (OSNR), and whether or not a signal can support additional capacity as real functions in the nonlinear optimization. Optionally, the adjusting is simulated in an application prior to operation on nodes in the optical network. Also, the method can be implemented in a controller or in an optical network.

Unblocking a Superchannel

Figure 26:
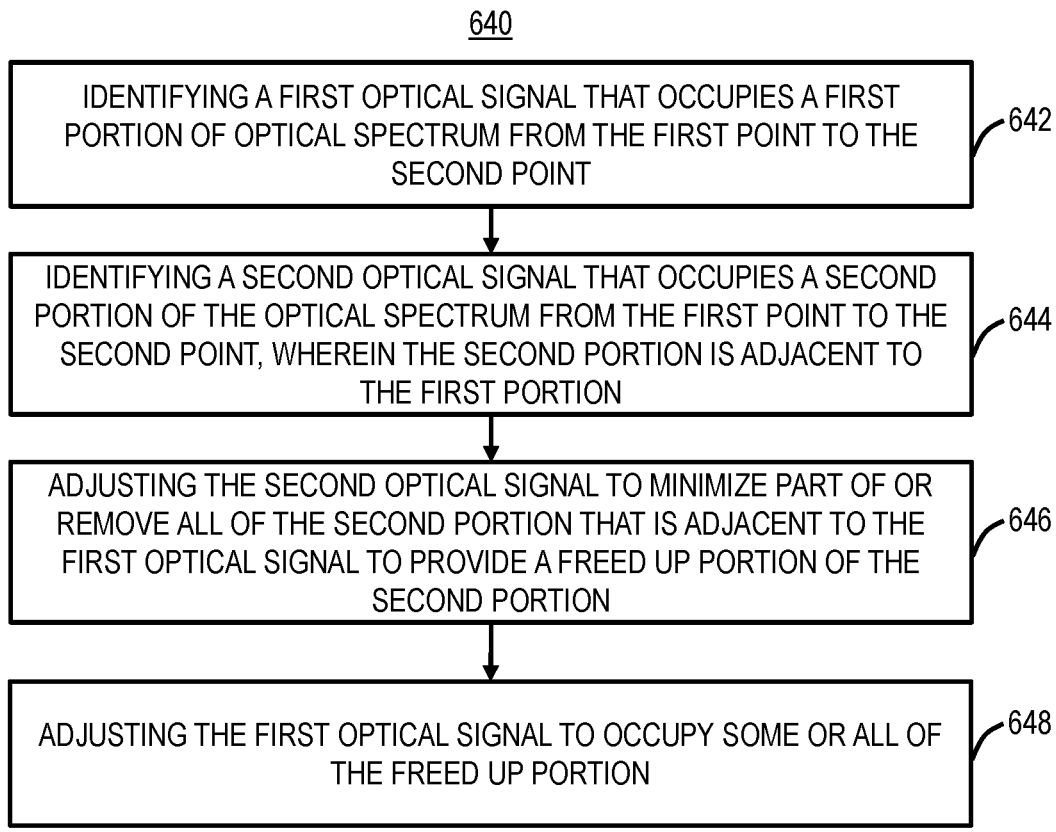
FIG. 26 is a flow chart of an unblocking method to increase the supportable capacity from a first point to a second point in an optical network.

Referring to FIG. 26, in an exemplary embodiment, a flow chart illustrates an unblocking method 640 to increase the supportable capacity from a first point to a second point in an optical network. The method 640 is a method of optimizing capacity of an optical network, such as the networks 100, 500, which can free up spectrum to allow for a superchannel or the like. The method 640 includes identifying a first optical signal that occupies a first portion of optical spectrum from the first point to the second point (step 642). The first optical signal is identified based on needing additional capacity, and the identification can be through any of the various algorithms described herein. The method 640 includes identifying a second optical signal that occupies a second portion of the optical spectrum from the first point to the second point, wherein the second portion is adjacent to the first portion (step 644). Here, the second optical signal can be viewed as preventing future growth of the first optical signal. The method 640 includes adjusting the second optical signal to minimize part of or remove all of the second portion that is adjacent to the first optical signal to provide a freed up portion of the second portion (step 646); and adjusting the first optical signal to occupy some or all of the freed up portion (step 648).

The second optical signal can co-propagate with the first optical signal through a first node of the optical network and can separately propagate through a second node of the optical network. The adjusting the first optical signal can be one of converting the first optical signal to a superchannel and increasing a modulation symbol rate. The adjusting the second optical signal can be one of moving the second optical signal to a disjoint portion of the spectrum from the first portion and reducing a spectral width of the second optical signal. The new path can be a third portion of the optical spectrum, which is disjoint from the first portion. The adjusting the second optical signal can be identifying a new path; increasing supported capacity on the new path; and transferring the freed up portion to the third path. The increasing supported capacity on the new path can be any of reducing nonlinear effects, increasing spectral width, and increasing power. The increasing supported capacity on the new path can be any of reducing nonlinear effects, increasing spectral width, and increasing power. The new path can be partially disjoint with a route previously taken by the second optical signal. The method can further include performing a nonlinear optimization to determine adjustments to the first optical signal and the second optical signal by modeling modem bit rate, Optical Signal to Noise Ratio (OSNR), and whether or not a signal can support additional capacity as real functions in the nonlinear optimization. Optionally, the adjusting is simulated in an application prior to operation on nodes in the optical network. Also, the method can be implemented in a controller or in an optical network.

In another exemplary embodiment, a method of increasing the supportable capacity from a first point to a second point in an optical network includes identifying a first optical signal that occupies a first portion of optical spectrum from the first point to the second point; identifying a second optical signal occupying a second portion of optical spectrum that co-propagates with the first signal through a first element of the optical network, and separately propagates through at a second element of the optical network; identifying a third path; increasing the supportable capacity of the third path; transferrin at least a portion of the traffic from the second optical signal to the third path; freeing up at least a portion of the second optical spectrum through the first element; changing the first optical signal to occupy at least some of that freed up-portion; and increasing the capacity of the first optical signal.

The change to the first optical signal cam include the addition of a carrier to a superchannel or an increase in modulation symbol rate. Increasing the supportable capacity of the third path can include a reduction of nonlinear effects, an increase in spectral width, and/or an increase in optical power. The third path can include a route that is at least partially disjoint with the route of the second optical signal. The third path can include a portion of the spectrum that is least partially disjoint with the portion of the spectrum occupied by the second optical signal. The transferring at least a portion of the traffic can include moving the wavelength of the second optical signal to the third path, moving the second optical signal away from the first element, reducing the traffic carried by the second optical signal, or increasing the traffic carried by a third optical signal. The freeing up at least a portion of the spectrum can include reducing the spectral width of the second optical signal or moving the wavelength of the second optical signal.

Planning Wavelength Assignments

Figure 27:
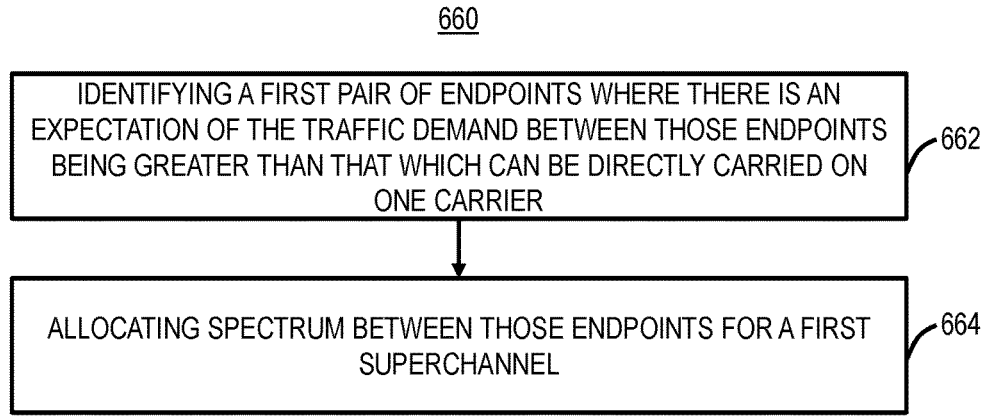
FIG. 27 is a flow chart of a method of planning wavelength assignments in a WDM mesh optical network.

Referring to FIG. 27, in an exemplary embodiment, a flow chart illustrates a method 660 of planning wavelength assignments in a WDM mesh optical network, such as the network 100, 500. The method 660 includes identifying a first pair of endpoints where there is an expectation of the traffic demand between those endpoints being greater than that which can be directly carried on one carrier (step 662) and allocating spectrum between those endpoints for a first superchannel (step 664). The allocated spectrum has a significant frequency separation from other superchannels and a signal between a second pair endpoints occupies spectrum between the first superchannel and another superchannel. Optionally, the allocated spectrum is not presently occupied by signals. A signal that at least partially overlaps the allocated spectrum can be moved or removed within a month or can remain for longer than a month.

The expected traffic demand can be greater than that which can be directly carried on three carriers or a reasonable maximum of what may occur from now until the end of a planning window. The amount of traffic which can be directly carried on one carrier is the amount that equipment presently used in the network could reliably carry between the endpoints on one carrier. The superchannel allocation has room for a plurality of modulated carriers or room for a broader modulation than presently exists between those endpoints. The significant frequency separation can be approximately the maximum possible given an anticipated number of superchannels. Optionally, the first superchannel is the only superchannel between the first endpoints.

Minimizing the Cost of a WDM Mesh Optical Network

Figure 28:
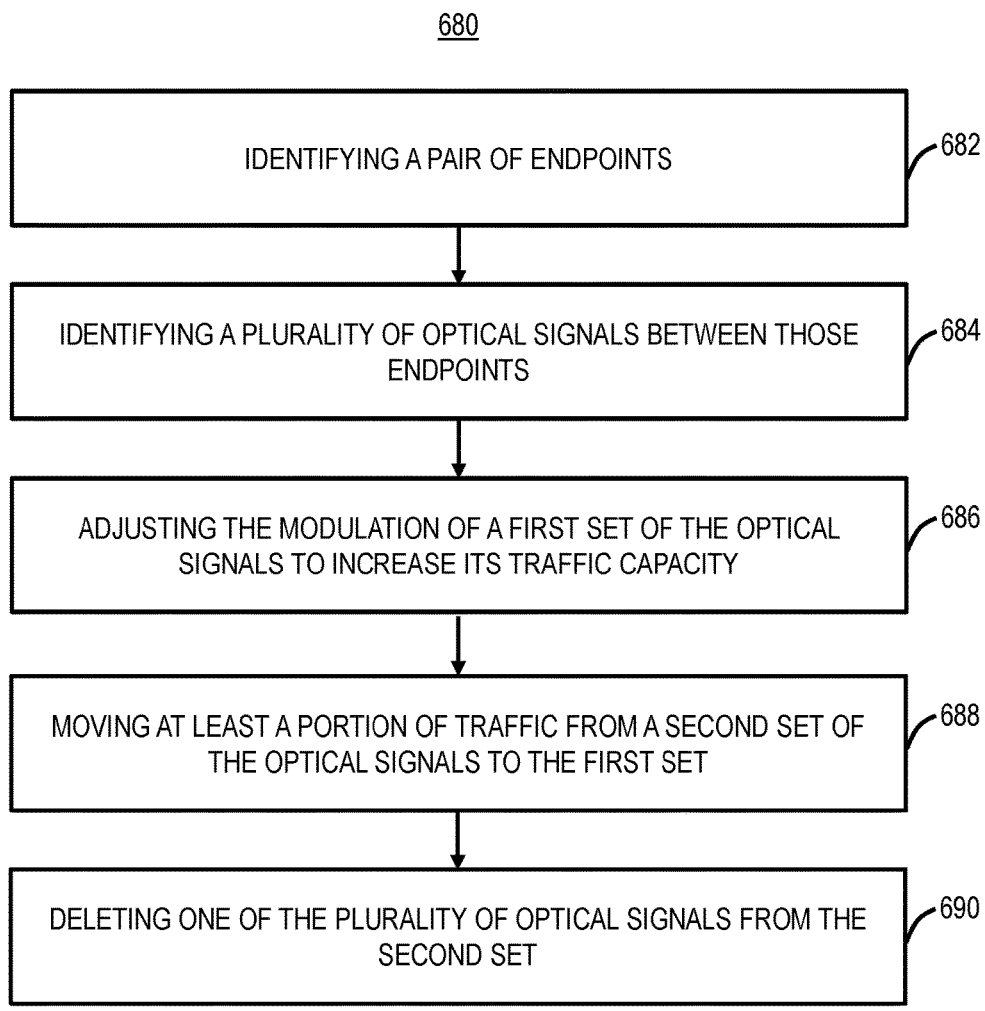
FIG. 28 is a flow chart of a method of minimizing the cost of a WDM mesh optical network.

Referring to FIG. 28, in an exemplary embodiment, a flow chart illustrates a method 680 of minimizing the cost of a WDM mesh optical network. The method 680 includes identifying a pair of endpoints (step 682); identifying a plurality of optical signals between those endpoints (step 684); adjusting the modulation of a first set of the optical signals to increase its traffic capacity (step 686); moving at least a portion of traffic from a second set of the optical signals to the first set (step 688); and deleting one of the plurality of optical signals from the second set (step 690). The method 680 can include improving wavelengths in the first set. The improving can include altering a third optical signal, raising the power, and/or increasing the spectral width.

Adjustment of the modulation of the first set can be controlled remotely by the endpoints. The portion of traffic can be all of the traffic on the second set, and the second set can be deleted. Optionally, another portion of traffic from the second optical signal is moved to a third optical signal. Deleting one the plurality of optical signals can include switching to distinct endpoints, switching the wavelength of the signal, shutting down an output of a transmitter, etc.

Exemplary Network Element

Figure 29:
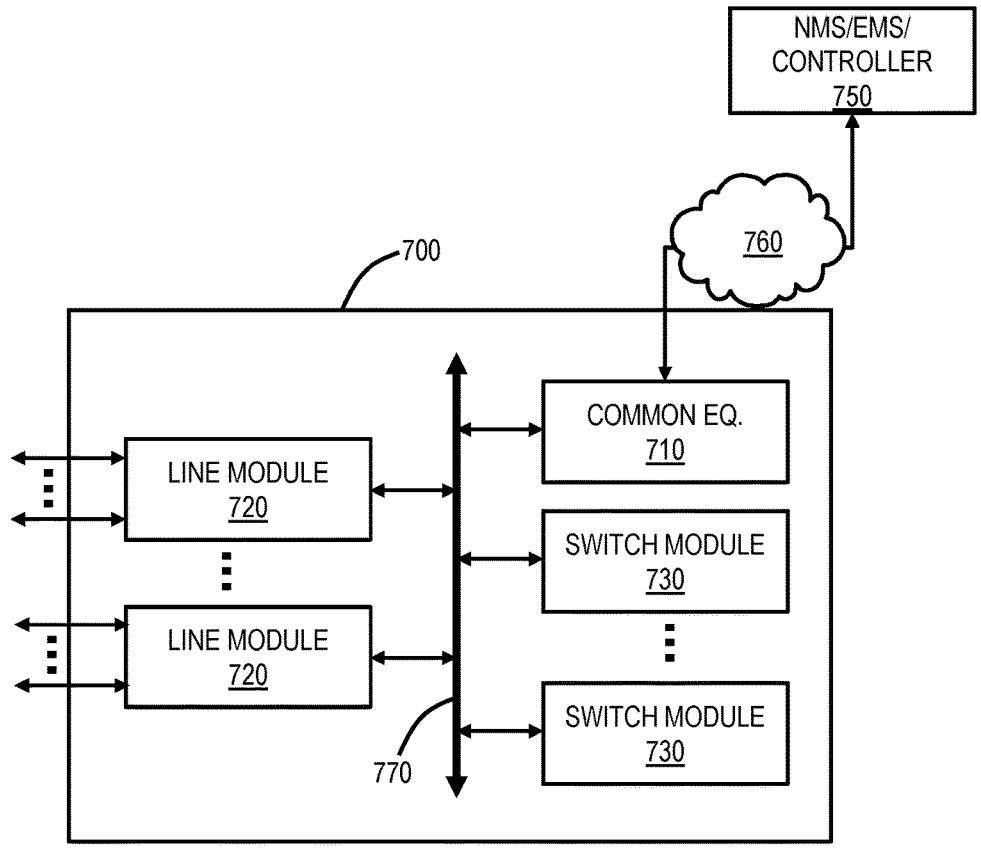
FIG. 29 is a block diagram of an exemplary network element for use with the systems and methods described herein.

Referring to FIG. 29, in an exemplary embodiment, a block diagram illustrates an exemplary network element 700 for use with the systems and methods described herein. In an exemplary embodiment, the exemplary network element 700 can be a network element that may consolidate the functionality of a multi-service provisioning platform (MSPP), digital cross connect (DCS), Ethernet and/or Optical Transport Network (OTN) switch, dense wave division multiplexed (DWDM) platform, etc. into a single, high-capacity intelligent switching system providing Layer 0, 1, and/or 2 consolidation, i.e. a Packet-Optical Transport System (POTS). In another exemplary embodiment, the network element 700 can be any of an OTN add/drop multiplexer (ADM), a multi-service provisioning platform (MSPP), a digital cross-connect (DCS), an optical cross-connect, an optical switch, a router, a switch, a wavelength division multiplexing (WDM) terminal, an access/aggregation device, etc. That is, the network element 700 can be any digital system with ingress and egress digital signals and switching therebetween of signals, timeslots, tributary units, etc. While the network element 700 is generally shown as an optical network element, the systems and methods contemplated for use with any switching fabric, network element, or network based thereon.

In an exemplary embodiment, the network element 700 includes common equipment 710, one or more line modules 720, and one or more switch modules 730. The common equipment 710 can include power; a control module; operations, administration, maintenance, and provisioning (OAM&P) access; user interface ports; and the like. The common equipment 710 can connect to a management system 750 through a data communication network 760 (as well as a Path Computation Element (PCE), SDN controller, OpenFlow controller, etc.). The management system 750 can include a network management system (NMS), element management system (EMS), or the like. Additionally, the common equipment 710 can include a control plane processor, a shelf controller, etc., such as a controller 800 illustrated in FIG. 30, configured to operate the control plane as described herein and/or to operate general OAM&P for the network element 700. The network element 700 can include an interface 770 for communicatively coupling the common equipment 710, the line modules 720, and the switch modules 730 therebetween. For example, the interface 770 can be a backplane, mid-plane, a bus, optical or electrical connectors, or the like. The line modules 720 are configured to provide ingress and egress to the switch modules 730 and to external connections on the links to/from the network element 700. In an exemplary embodiment, the line modules 720 can form ingress and egress switches with the switch modules 730 as center stage switches for a three-stage switch, e.g. a three stage Clos switch. Other configurations and/or architectures are also contemplated. The line modules 720 can include optical transceivers, transponders, and/or modems, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, etc. The line modules 720 can include the modems 300.

Further, the line modules 720 can include a plurality of optical connections per module and each module may include a flexible rate support for any type of connection, such as, for example, 155 MB/s, 622 MB/s, 1 GB/s, 2.5 GB/s, 10 GB/s, 40 GB/s, and 100 GB/s, N×1.25 GB/s, and any rate in between. The line modules 720 can include wavelength division multiplexing interfaces, short reach interfaces, and the like, and can connect to other line modules 720 on remote network elements, end clients, edge routers, and the like, e.g. forming connections on the links. From a logical perspective, the line modules 720 provide ingress and egress ports to the network element 700, and each line module 720 can include one or more physical ports. The switch modules 730 are configured to switch signals, timeslots, tributary units, packets, wavelengths, etc. between the line modules 720. For example, the switch modules 730 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 730 can include Time Division Multiplexed (TDM) (i.e., circuit switching) and/or packet switching engines. The switch modules 730 can include redundancy as well, such as 1:1, 1:N, etc. In an exemplary embodiment, the switch modules 730 provide OTN switching and/or Ethernet switching.

Those of ordinary skill in the art will recognize the network element 700 can include other components which are omitted for illustration purposes, and that the systems and methods described herein is contemplated for use with a plurality of different network elements with the network element 700 presented as an exemplary type of a network element. For example, in another exemplary embodiment, the network element 700 may not include the switch modules 730, but rather have the corresponding functionality in the line modules 720 (or some equivalent) in a distributed fashion. Alternatively, the network element 700 may not need the corresponding switching functionality in the case of a WDM terminal. For the network element 700, other architectures providing ingress, egress, and switching therebetween are also contemplated for the systems and methods described herein. In general, the systems and methods described herein contemplate use with any network element providing switching of signals, timeslots, tributary units, wavelengths, etc. and using the control plane. Furthermore, the network element 700 is merely presented as one exemplary network element 700 for the systems and methods described herein.

Managing Excess Capacity

The margin-based optimization systems and methods described herein create additional capacity in the networks 100, 500 that has to be managed logically. Commonly-assigned U.S. patent application Ser. No. 14/176,908, filed Feb. 10, 2014, and entitled, "SYSTEMS AND METHODS FOR MANAGING EXCESS OPTICAL CAPACITY AND MARGIN IN OPTICAL NETWORKS," the contents of which are incorporated by reference herein, describes various exemplary techniques for managing the new capacity provided by the margin-based optimization systems and methods in the network 100, 500. In an exemplary embodiment, a method for managing the excess capacity includes determining excess margin relative to margin needed to insure performance at a nominal guaranteed rate associated with a flexible optical modem configured to communicate over an optical link; causing the flexible optical modem to consume most or all of the excess margin, wherein capacity increased above the nominal guaranteed rate in the flexible optical modem includes excess capacity; and mapping the excess capacity to one or more logical interfaces for use by a management system, management plane, and/or control plane. This leverages the POTS capability as a L0, L1, and/or L2 device which can create excess capacity at L0 using the various techniques described herein and logically mapping this excess capacity in L1 and/or L2 for additional opportunities.

Shelf Controller

Figure 30:
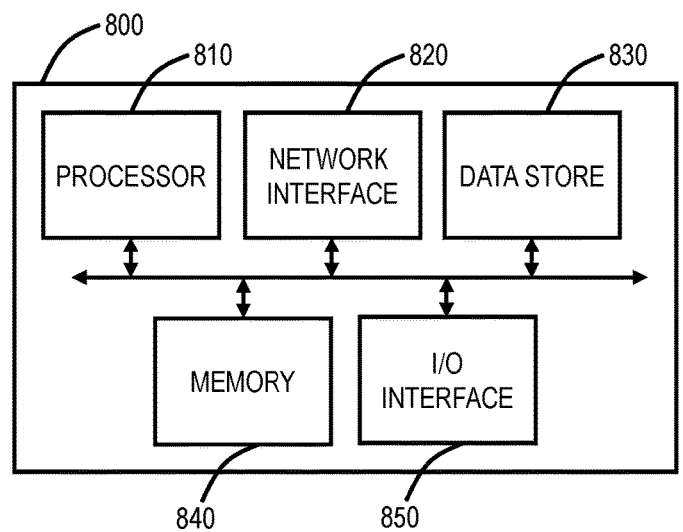
FIG. 30 is a block diagram illustrates a controller to provide control plane processing and/or operations, administration, maintenance, and provisioning (OAM&P) for the network element of FIG. 29.

Referring to FIG. 30, in an exemplary embodiment, a block diagram illustrates a controller 800 to provide control plane processing and/or operations, administration, maintenance, and provisioning (OAM&P) for the network element 700. The controller 800 can be part of common equipment, such as common equipment 710 in the network element 700, or a stand-alone device communicatively coupled to the network element 700 via the DCN 760. The controller 800 can include a processor 810 which is a hardware device for executing software instructions such as operating the control plane. The processor 810 can be any custom made or commercially available processor, a central processing unit (CPU), an auxiliary processor among several processors associated with the controller 800, a semiconductor-based microprocessor (in the form of a microchip or chip set), or generally any device for executing software instructions. When the controller 800 is in operation, the processor 810 is configured to execute software stored within memory, to communicate data to and from the memory, and to generally control operations of the controller 800 pursuant to the software instructions. The controller 800 can also include a network interface 820, a data store 830, memory 840, an input/output (I/O) interface 850, and the like, all of which are communicatively coupled therebetween and with the processor 810.

The network interface 820 can be used to enable the controller 800 to communicate on the DCN 760, such as to communicate control plane information to other controllers, to the management system 750, to the SDN controller 160, and the like. The network interface 820 can include, for example, an Ethernet card (e.g., 10BaseT, Fast Ethernet, Gigabit Ethernet) or a wireless local area network (WLAN) card (e.g., 802.11). The network interface 820 can include address, control, and/or data connections to enable appropriate communications on the network. The data store 830 can be used to store data, such as control plane information, provisioning data, OAM&P data, measured metrics, etc. The data store 830 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 830 can incorporate electronic, magnetic, optical, and/or other types of storage media. The memory 840 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 840 may incorporate electronic, magnetic, optical, and/or other types of storage media. Note that the memory 840 can have a distributed architecture, where various components are situated remotely from one another, but may be accessed by the processor 810. The I/O interface 850 includes components for the controller 800 to communicate with other devices. Further, the I/O interface 850 includes components for the controller 800 to communicate with the other nodes, such as using overhead associated with OTN signals.

In an exemplary embodiment, the controller 800 is configured to communicate with other controllers 800 in the network 100, 500 to operate the control plane for control plane signaling. This communication may be either in-band or out-of-band. For SONET networks and similarly for SDH networks, the controllers 800 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 800 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within the Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within the Optical Channel Data Unit-k (ODUk) overhead. In the present disclosure, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. Other mechanisms are also contemplated for control plane signaling.

The controller 800 can be configured to operate the control plane in the network 100, 500. That is, the controller 800 is configured to implement software, processes, algorithms, etc. that control configurable features of the network 100, 500, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 800 can include a topology database that maintains the current topology of the network 100, 500 based on control plane signaling and a connection database that maintains available bandwidth on the links again based on the control plane signaling. Again, the control plane is a distributed control plane; thus a plurality of the controllers 800 can act together to operate the control plane using the control plane signaling to maintain database synchronization. In source-based routing, the controller 800 at a source node for a connection is responsible for path computation and establishing by signaling other controllers 800 in the network 100. For example, the originating node and its controller 800 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. Path computation generally includes determining a path, i.e. traversing the links through the nodes from the source node to the destination node based on a plurality of constraints such as administrative weights on the links, bandwidth availability on the links, etc.

In an exemplary embodiment, the controller 800 can be configured to compute, calculate, estimate, store, etc. the metrics based on data from the modems 300. The controller 800 can store these metrics in the data store 830 and/or provide the metrics to external devices such as the SDN controller 160 via the network interface 820. The metrics can be updated periodically as well to provide current, up-to-date information about the photonic layer.

SDN Controller/Service for the Application

Figure 31:
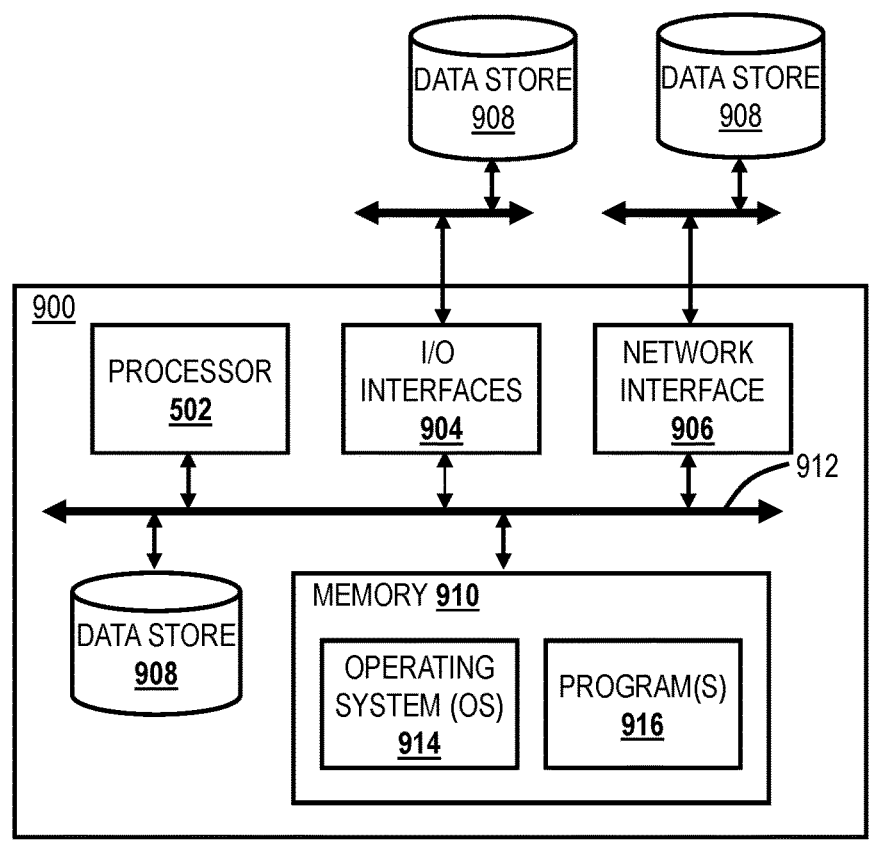
FIG. 31 is a block diagram of a server.

Referring to FIG. 31, in an exemplary embodiment, a block diagram illustrates s server 900. The server 900 can be a digital computer that, in terms of hardware architecture, generally includes a processor 902, input/output (I/O) interfaces 904, a network interface 906, a data store 908, and memory 910. It should be appreciated by those of ordinary skill in the art that FIG. 31 depicts the server 900 in an oversimplified manner, and a practical embodiment may include additional components and suitably configured processing logic to support known or conventional operating features that are not described in detail herein. The components (902, 904, 906, 908, and 910) are communicatively coupled via a local interface 912. The local interface 912 can be, for example but not limited to, one or more buses or other wired or wireless connections, as is known in the art. The local interface 912 can have additional elements, which are omitted for simplicity, such as controllers, buffers (caches), drivers, repeaters, and receivers, among many others, to enable communications. Further, the local interface 912 can include address, control, and/or data connections to enable appropriate communications among the aforementioned components.

The processor 902 is a hardware device for executing software instructions. The processor 902 can be any custom made or commercially available processor, a central processing unit (CPU), an auxiliary processor among several processors associated with the server 900, a semiconductor-based microprocessor (in the form of a microchip or chip set), or generally any device for executing software instructions. When the server 900 is in operation, the processor 902 is configured to execute software stored within the memory 910, to communicate data to and from the memory 910, and to generally control operations of the server 900 pursuant to the software instructions. The I/O interfaces 904 can be used to receive user input from and/or for providing system output to one or more devices or components. User input can be provided via, for example, a keyboard, touch pad, and/or a mouse. System output can be provided via a display device and a printer (not shown). I/O interfaces 904 can include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 906 can be used to enable the server 900 to communicate on a network. The network interface 906 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 906 can include address, control, and/or data connections to enable appropriate communications on the network. A data store 908 can be used to store data. The data store 908 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 908 can incorporate electronic, magnetic, optical, and/or other types of storage media. In one example, the data store 908 can be located internal to the server 900 such as, for example, an internal hard drive connected to the local interface 912 in the server 900. Additionally in another embodiment, the data store 908 can be located external to the server 900 such as, for example, an external hard drive connected to the I/O interfaces 904 (e.g., SCSI or USB connection). In a further embodiment, the data store 908 can be connected to the server 900 through a network, such as, for example, a network attached file server.

The memory 910 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 910 can incorporate electronic, magnetic, optical, and/or other types of storage media. Note that the memory 910 can have a distributed architecture, where various components are situated remotely from one another, but can be accessed by the processor 902. The software in memory 910 can include one or more software programs, each of which includes an ordered listing of executable instructions for implementing logical functions. The software in the memory 910 includes a suitable operating system (O/S) 914 and one or more programs 916. The operating system 914 essentially controls the execution of other computer programs, such as the one or more programs 516, and provides scheduling, input-output control, file and data management, memory management, and communication control and related services. The one or more programs 916 may be configured to implement the various processes, algorithms, methods, techniques, etc. described herein.

In an exemplary embodiment, the SDN controller 160 can be implemented through the server 900 where the network interface 908 is communicatively coupled to one or more nodes in an optical network. The SDN controller 160 can also include an Application Programming Interface (API) which allows additional applications to interface with the SDN controller 160 for data associated with the optical network. In an exemplary embodiment, the application 510 can be implemented on the server 900 (or on the server 900 operating as the SDN controller 160) and receive data through the API. Other configurations are also contemplated.

Additionally, it will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A computer-implemented method, implemented in one of a Network Management System (NMS), an Element Management System (EMS), a Software Defined Networking (SDN) controller, and a server executing an SDN application, to increase capacity of one or more links in an optical network, the computer-implemented method comprising:

determining Net System Margin comprising a metric of overall excess margin in the optical network until a Forward Error Correction (FEC) limit is reached;

performing an optimization of a plurality of parameters of the optical network, including one or more parameters associated with at least one optical channel, to determine which settings adjustable by at least one of a plurality of modems and a photonic control in the optical network, are appropriate in the optical network to provide the increased capacity and to consume at least part of the Net System Margin to maximize throughput; and causing the at least one of the plurality of modems and the photonic control in the optical network to change settings based on the optimization to provide the increased capacity.

2. The computer-implemented method of claim 1, wherein the determined Net System Margin is based on one or more of measured data and estimated data associated with the at least one optical channel from nodes in the optical network communicatively coupled to one of the NMS, the EMS, the SDN controller, and the server, wherein the measured data and the estimated data is utilized to determine real-time margin based on non-linear impairments, link loss, dispersion, and error rates.

3. The computer-implemented method of claim 1, wherein the settings comprise one or more of per channel power, amplifier gain, wavelength, modulation format, precompensation, spectral width, spectral shape, spectral spacing, superchannels, baud rate, and FEC parameters.

4. The computer-implemented method of claim 1, further comprising:
computing and displaying a dashboard showing the Net System Margin and one or more additional metrics of the optical network, wherein the one or more additional metrics comprise health detailing a view of non-blocked restoration paths and network resiliency and restorability, throughput comprising how much data is currently being transported in the optical network, and excess bandwidth comprising how much excess capacity is available in the optical network.

5. The computer-implemented method of claim 1, wherein the optimization comprises one or more of a single channel optimization, a gridded full optimization, a superchannel full optimization, a gridded mesh optimization, a gridless mesh optimization, and a genetic algorithm optimization.

6. The computer-implemented method of claim 1, wherein the optimization comprises a multi-channel, non-linear aware, link modeling routine which uses an objective function.

7. The computer-implemented method of claim 1, wherein the optimization has a plurality of assumptions based on the optical network included to constrain inputs.

8. The computer-implemented method of claim 1, wherein the settings are adjusted for wavelengths to change optical power, bit rate, baud rate, and modulation format and for optical channels to change parameters associated with paths the wavelengths traverses such as frequency spacing, spectrum amount, and optical component settings.

9. A system comprising one of a Network Management System (NMS), an Element Management System (EMS), a Software Defined Networking (SDN) controller, and a server executing an SDN application, adapted to increase capacity of one or more links in an optical network, the system comprising:
a network interface and a processor communicatively coupled to one another; and
memory storing instructions that, when executed, cause the processor to
determine Net System Margin comprising a metric of overall excess margin in the optical network until a Forward Error Correction (FEC) limit is reached,
perform an optimization of a plurality of parameters of the optical network, including one or more parameters associated with at least one optical channel, to determine which settings, adjustable by at least one of a plurality of modems and a photonic control in the optical network, are appropriate in the optical network to provide the increased capacity and to consume at least part of the Net System Margin to maximize throughput, and
communicate via the network interface to the optical network to cause at least one of the plurality of modems and the photonic control in the optical network to change settings based on the optimization to provide the increased capacity.

10. The system of claim 9, wherein the determined Net System Margin is based on one or more of measured data and estimated data associated with the at least one optical channel from nodes in the optical network communicatively coupled to one of the NMS, the EMS, the SDN controller, and the server, wherein the measured data and the estimated data is utilized to determine real-time margin based on non-linear impairments, link loss, dispersion, and error rates.

11. The system of claim 9, wherein the settings comprise one or more of per channel power, amplifier gain, wavelength, modulation format, precompensation, spectral width, spectral shape, spectral spacing, superchannels, baud rate, and FEC parameters.

12. The system of claim 9, wherein the memory storing instructions that, when executed, cause the processor to
compute and display a dashboard showing the Net System Margin and one or more additional metrics of the optical network, wherein the one or more additional metrics comprise health detailing a view of non-blocked restoration paths and network resiliency and restorability, throughput comprising how much data is currently being transported in the optical network, and excess bandwidth comprising how much excess capacity is available in the optical network.

13. The system of claim 9, wherein the optimization comprises one or more of a single channel optimization, a gridded full optimization, a superchannel full optimization, a gridded mesh optimization, a gridless mesh optimization, and a genetic algorithm optimization.

14. The system of claim 9, wherein the optimization comprises a multi-channel, non-linear aware, link modeling routine which uses an objective function.

15. The system of claim 9, wherein the optimization has a plurality of assumptions based on the optical network included to constrain inputs.

16. The system of claim 9, wherein the settings are adjusted for wavelengths to change optical power, bit rate, baud rate, and modulation format and for optical channels to change parameters associated with paths the wavelengths traverses such as frequency spacing, spectrum amount, and optical component settings.

17. An optical network with a system adapted to increase capacity of one or more links the optical network, the system comprising:
a plurality of nodes interconnected optically to one another by a plurality of links; and
a server communicatively coupled to one or more of the nodes, wherein the server comprises one of a Network Management System (NMS), an Element Management System (EMS), a Software Defined Networking (SDN) controller, and a server executing an SDN application, and
wherein the server is adapted to
determine Net System Margin comprising a metric of overall excess margin in the optical network until a Forward Error Correction (FEC) limit is reached,
perform an optimization of a plurality of parameters of the optical network, including one or more parameters associated with at least one optical channel, to determine which settings, adjustable by at least one of a plurality of modems and a photonic control in the optical network, are appropriate in the optical network to provide the increased capacity and to consume at least part of the Net System Margin to maximize throughput, and communicate via the network interface to the optical network to cause the at least one of the plurality of modems and the photonic control in the optical network to change settings based on the optimization to provide the increased capacity.

18. The optical network of claim 17 wherein the determined Net System Margin is based on one or more of measured data and estimated data associated with the at least one optical channel from nodes in the optical network communicatively coupled to one of the NMS, the EMS, the SDN controller, and the server, wherein the measured data and the estimated data is utilized to determine real-time margin based on non-linear impairments, link loss, dispersion, and error rates.

19. The optical network of claim 17, wherein the settings comprise one or more of per channel power, amplifier gain, wavelength, modulation format, precompensation, spectral width, spectral shape, spectral spacing, superchannels, baud rate, and FEC parameters.

20. The optical network of claim 17, wherein the optimization comprises one or more of a single channel optimization, a gridded full optimization, a superchannel full optimization, a gridded mesh optimization, a gridless mesh optimization, and a genetic algorithm optimization.

* * * * *